US012784374B2

(12) United States Patent
Seker et al.

(10) Patent No.: US 12,784,374 B2
(45) Date of Patent: Nov. 3, 2026

(54) VIRTUAL STAGING PLATFORM INCLUDING MULTIVIEW STAGING

(71) Applicant: MFTB Holdco, Inc., Seattle, WA (US)

(72) Inventors: Serif Erkam Seker, Munich (DE); Fabian Herzog, Munich (DE); Mahdi Saleh, Munich (DE); Michal Stary, Munich (DE); Michael Bonacina, Munich (DE); Clemens Ntachoyima Kigadye, Munich (DE); Nathan Joseph Skelley, Munich (DE); Mikhail Andreev, Munich (DE)

(73) Assignee: MFTB Holdco, Inc., Seattle, WA (US)

( * ) Notice: Subject to any disclaimer, the term of this patent is extended or adjusted under 35 U.S.C. 154(b) by 140 days.

(21) Appl. No.: 18/957,238

(22) Filed: Nov. 22, 2024

(65) Prior Publication Data

US 2026/0148503 A1 May 28, 2026

(51) Int. Cl.
*G06T 19/00* (2011.01)
*G06T 15/00* (2011.01)

(52) U.S. Cl.
CPC .......... *G06T 19/003* (2013.01); *G06T 15/005* (2013.01)

(58) Field of Classification Search
None
See application file for complete search history.

(56) References Cited

U.S. PATENT DOCUMENTS

| | | | | |
|---|---|---|---|---|
| 2021/0173474 A1* | 6/2021 | Sztuk | ...................... | G06F 3/013 |
| 2024/0046554 A1* | 2/2024 | Bai | ...................... | G06T 15/005 |
| 2024/0248765 A1* | 7/2024 | Scanlan | ................ | G06F 9/5038 |
| 2025/0239005 A1* | 7/2025 | Kim | ...................... | G06T 3/4007 |
| 2025/0336154 A1* | 10/2025 | Zhang | ..................... | G06T 17/20 |

FOREIGN PATENT DOCUMENTS

WO 2024/219563 A1 10/2024

OTHER PUBLICATIONS

Slacheva, Mira et al., "An Empty Room is All We Want: Automatic Defurnishing of Indoor Panoramas", IEEE/CVF Conference on Computer Vision and Pattern Recognition Workshops (CVPRW), 2024, (downloaded from https://matterport.github.io/automatic-defurnishing-of-indoor-panoramas/ on Nov. 7, 2024).

(Continued)

*Primary Examiner* — Tapas Mazumder
(74) *Attorney, Agent, or Firm* — Merchant & Gould, P.C.

(57) ABSTRACT

A virtual staging platform includes a staging model. In some examples, the platform also includes a removal model, and/or a multi-view staging model. The staging model uses a diffusion model useable to generate a low-resolution staged image and a rendering module useable to improve and introduce photorealistic features into the staged image. The removal model is implemented using a diffusion model and uses a binary mask identifying areas including objects for removal. The multi-view staging model receives two images of a space taken from two different perspectives, and generates a three-dimensional reconstruction of the scene. A view from at least one of the images is staged, and the staged objects are made consistent across the two images.

21 Claims, 17 Drawing Sheets

(56) References Cited

OTHER PUBLICATIONS

Brooks, Time et al., "InstructPix2Pix: Learning to Follow Image Editing Instructions", University of California, Berkeley, CVPR 2023, (downloaded from https://www.timothybrooks.com/instruct-pix2pix on Nov. 7, 2024).
Partial search report issued in co-pending application 25217448.7 on Feb. 16, 2026.
Shuzhe Wang et al: "DUSt3R: Geometric 3D 1-14 Vision Made Easy", arxiv.org, Cornell University Library, 201 Olin Library Cornell University Ithaca, NY 14853, Oct. 26, 2024.
Lukas Hoellein et al: "Text2Room: 1-14 Extracting Textured 3D Meshes from 2D Text-to-Image Models", arxiv.org, Cornell University Library, 201 Olin Library Cornell University Ithaca, NY 14853, Sep. 10, 2023.
Chen Junming et al: "Creative interior 1-14 design matching the indoor structure generated through diffusion model with an improved control network", Frontiers of Architectural Research, Sep. 21, 2024 (Sep. 21, 2024), pp. 1-16, XP093348670, Retrieved from the Internet: URL:https://www.researchgate.net/publication/384237672_Creative_interior_design_matching_the_indoor_structure_generated_through_diffusion_model_with_an_improved_control_network>.

* cited by examiner

VIRTUAL STAGING PLATFORM INCLUDING MULTIVIEW STAGING

BACKGROUND

Virtual staging has emerged as a powerful tool in real estate marketing, allowing empty or outdated spaces to be digitally furnished and decorated to showcase their potential without incurring the cost of physical staging processes, arranging for timing of professional photography of staged spaces, and the like. However, creating realistic and convincing virtual stagings presents several significant technical challenges.

For example, generating photorealistic furniture and decor that seamlessly blends with the existing room is a complex task due to the difficulty in maintaining consistency in lighting, shadows, reflections, and textures with the input image. Additionally, generating furnishing arrangements that are aesthetically pleasing and functionally plausible is challenging, as it requires understanding of room geometry, spatial relationships, and the like, as well as style consistency.

SUMMARY

In accordance with aspects of the present disclosure, a virtual staging platform is disclosed. In examples, the platform includes a staging model, a removal model, and/or a multi-view staging model. The staging model uses a diffusion model useable to generate a low-resolution staged image and a rendering module useable to improve and introduce photorealistic features into the staged image. The removal model is implemented using a diffusion model and uses a binary mask identifying areas including objects for removal. The multi-view staging model receives two images of a space taken from two different perspectives, and generates a three-dimensional reconstruction of the scene. A view from at least one of the images is staged, and the staged objects are made consistent across the two images.

In a first aspect, a virtual staging platform includes a computing system including a processor and a memory. The memory is communicatively connected to the processor and stores instructions which, when executed by the processor, cause the virtual staging platform to perform operations that include: receiving, at the computing system, a plurality of images of a space including at least a first image captured at a first perspective and a second image captured at a second perspective different from the first perspective; receiving, at the computing system, a room type input and a style theme input, the room type input and style theme input being associated with the plurality of images; and generating, at a transformer model, a three-dimensional reconstruction of the paired images. The operations further include providing the room type input, the style theme input, and a selected image from among the first image and the second image to a diffusion model to perform a staging process, the staging process generating a first staged image of the space including a selection and layout of a plurality of virtual furnishing items depicted in the selected image, the plurality of virtual furnishing items depicted by the diffusion model in accordance with the selected room type input and style theme input; and generating, based on another image of the first image and the second image, a second staged image of the space using a second diffusion model, the second staged image being a reprojection, within the another image, of the plurality of virtual furnishing items in accordance with the selection and layout. The operations further include rendering the first staged image and the second staged image, using a rendering module, to generate higher-resolution representations of at least the virtual furnishing items within the first staged image and the second staged image.

In a second aspect, a method of performing multi-view virtual staging is disclosed. The method includes receiving, at a computing system, a plurality of images of a space including at least a first image captured at a first perspective and a second image captured at a second perspective different from the first perspective; receiving, at the computing system, a room type input and a style theme input, the room type input and style theme input being associated with the plurality of images; and generating, at a transformer model, a three-dimensional reconstruction of the paired images. The method further includes providing the room type input, the style theme input, and a selected image from among the first image and the second image to a diffusion model to generate a first staged image of the space including a selection and layout of a plurality of virtual furnishing items depicted in the selected image, the plurality of virtual furnishing items depicted by the diffusion model in accordance with the selected room type input and style theme input; and generating, based on another image of the first image and the second image, a second staged image of the space using a second diffusion model, the second staged image being a reprojection, within the another image, of the plurality of virtual furnishing items in accordance with the selection and layout. The method also includes rendering, at the computing system, the first staged image and the second staged image to generate higher-resolution representations of at least the virtual furnishing items within the first staged image and the second staged image.

In a third aspect, a method of performing virtual staging of a living space is disclosed. The method includes receiving, at a computing system, an image of a space, and receiving, at the computing system, a room type input, and a style theme input. The method further includes obtaining a depth map of the image and a color map of the image, and prompting a diffusion model to generate a staged image including a selection and layout of a plurality of virtual furnishing items depicted in the depth map based on the room type input, the style theme input, and merging the staged image with the color map to generate an output image, wherein the plurality of virtual furnishing items are depicted by the diffusion model in accordance with the selected room type input and style theme input, and the diffusion model is trained on image pairs of empty and staged rooms labeled with a room type and a style theme. The method further includes performing a rendering operation at the computing system to generate a higher-resolution output image, the rendering operation including applying an image segmentation module, an object detection module, and one or more diffusion models, wherein the image segmentation module and object detection module determine a layout and structure of the virtual furnishing items, and generate one or more control constraints provided to the one or more diffusion models used to generate the higher-resolution representations.

In further example aspects, a method of performing virtual staging includes receiving an image of a space along with room type and style theme inputs, obtaining depth and color maps of the image, and using a diffusion model to generate a staged image. The diffusion model is specifically trained on pairs of empty and staged rooms that are labeled with room types and style themes to enable selection and layout of virtual furnishing items according to the input parameters.

In still further aspects, the virtual staging platform includes a removal model that receives a mask definition identifying areas containing objects to be removed from an input image. The removal model performs an removal process using a second diffusion model to generate a removal image with the identified objects removed, where the second diffusion model is trained using pairs of furnished and empty room images. The platform compares image characteristics within and outside the mask to enable higher levels of detail to be generated while ensuring consistency of surface textures and other visual elements.

DETAILED DESCRIPTION

Figure 1:
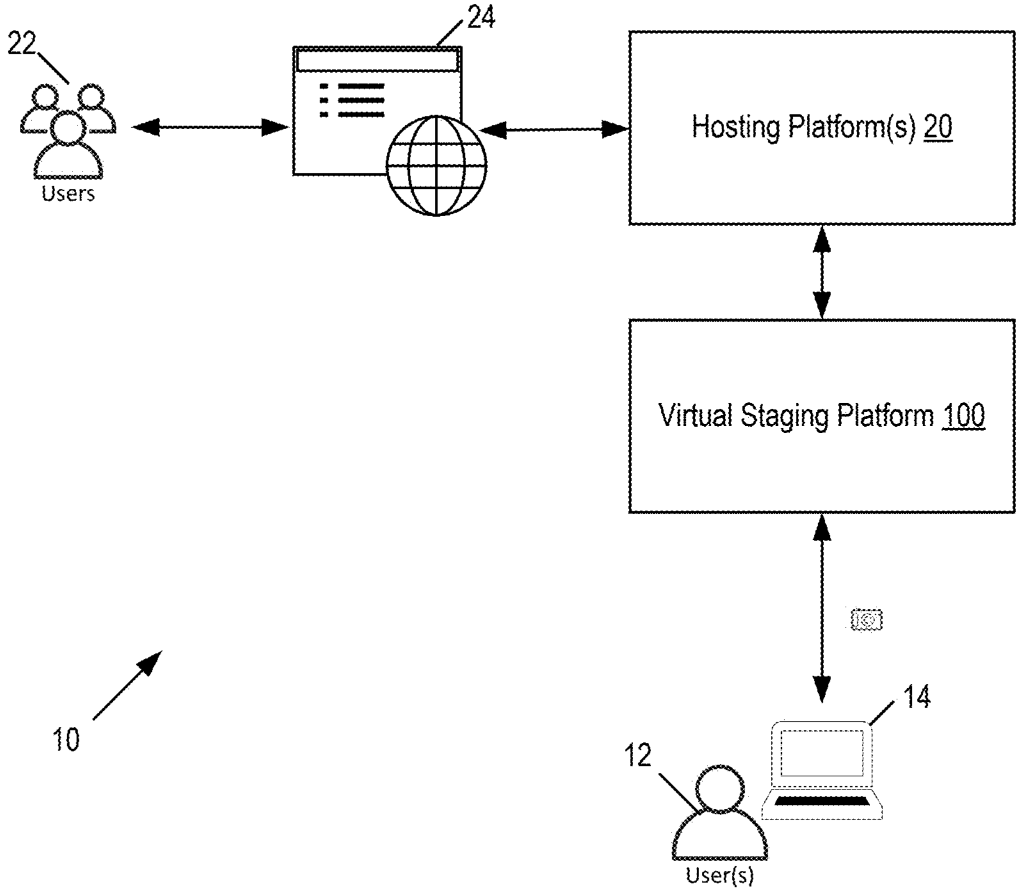
FIG. 1 illustrates a system diagram showing components of a virtual staging platform and its interaction with users and hosting websites, according to an example implementation environment.

As briefly described above, embodiments of the present invention are directed to a virtual staging platform. In example aspects, the virtual staging platform includes a staging model. In further example aspects, the virtual staging platform includes a removal model. In further aspects, the virtual staging platform includes a multi-view staging model.

In examples, a staging model uses a diffusion model useable to generate a low-resolution staged image and a rendering module useable to improve and introduce photorealistic features into the staged image. The diffusion model may be trained on image pairs of empty and staged rooms. The staging model uses a preprocessing to extract geometry and features of the room, including monocular depth estimation and room layout prediction. A low-resolution staged image is generated, conditioned on room type and style inputs. A rendering module is used to generate a higher-resolution version of the staged image, using a pipeline of image segmentation, object detection, and diffusion models to provide enhanced detail while preserving original room areas. In some instances, a tiled upscaling approach may be used to improve a level of detail in the images, with linear blending used to ensure consistency in a final upscaled, rendered image.

In further examples, the removal model is implemented using a diffusion model and uses a binary mask identifying areas including objects for removal. A user may define a mask by selecting areas of an image containing objects to be removed. A diffusion model trained on a reverse of the staging data (e.g., staged, and empty room pairs) may be used to generate output images. A plurality of output images may be generated, and one or more such images may be selected based on image analysis techniques, such as texture comparison inside and outside of the masked areas. In some instances, depth information may be used to assist an inpainting process performed by the diffusion model.

In examples, a multi-view staging model receives at least two images of a space taken from two different perspectives, and generates a three-dimensional reconstruction of the scene. The three-dimensional reconstruction may be generated using a transformer model that predicts a three-dimensional representation as a pointmap. Camera positions may be extracted and included in the three-dimensional representation. A first image of the received images is staged with virtual staged furnishings, for example using the staging model described above. The staged objects are reprojected onto a second image based on the three-dimensional reconstruction using a reprojection mask. An inpainting model generates virtual staged furnishings for the second image in a manner consistent with the first staged image.

In some implementations, the received images are staged jointly, with cross-attention between the views. In some examples, this may improve local consistency of specific virtual furnishing items across the generated views. A rendering module processes the staged views to generate higher-resolution output images. The rendering module uses a common set of lighting and shadow information to generate photorealistic details in the staged views that are consistent across perspectives.

Overall, the virtual staging platform described herein provides a number of advantages. With respect to staging, the model process generates photorealistic images of room spaces in accordance with user-defined styles, selecting furnishings that match the selected style in presenting a layout that is logical and consistent with room layout. The photorealistic images include effects to match existing texture, lighting, shadows, and the like to the input (unstaged) image. This enables highly-realistic staged image spaces to be used in circumstances where room images are to be presented. Such room images may be quickly generated for use in real estate listings for home sales or rentals, marketing materials associated with office spaces or corporate events, virtual/augmented reality spaces, interior design, and the like, while avoiding the time delays and expense of physical room staging.

With respect to removal, the model process similarly generates photorealistic images based on source photos to predict room layout, floor/wall textures, and the like while making the removal process for a user as simple as electing an area of an image that includes one or more objects to be removed.

FIG. 1 illustrates a system diagram 10 showing example use and operation of a virtual staging platform 100, including interaction with users and hosting platform(s). In general, and as discussed above, the virtual staging platform 100 may be used to generate staged images of spaces that can be used for real estate listings, corporate events, interior design, or virtual reality use. As such, one or more users 12 may access the virtual staging platform 100, e.g., via a computing device 14 (a personal computer or mobile device, or the like) to provide images to be staged. The images to be staged may include images of empty spaces, or images of partially furnished spaces that are to be restaged according to a new/different style or theme. Staged images generated by the virtual staging platform may be returned to the user 12 for use, or may be provided to a hosting environment, such as hosting platform(s) 20. The hosting platform(s) 20 may vary depending on the use case from among those described above; in an example implementation, hosting websites may include real estate listing websites and/or virtual reality environment hosting sites. Images generated by the virtual staging platform 100 may be displayed via the hosting platform 20 via an interface, e.g., web interface 24 (or other interfaces, such as a mobile application-based interface) to users 22. Users 22 may access the web interface 24 via a browser, mobile application, and the like, to view the specific hosting environment and virtually staged images therein. As such, images provided by user(s) 12 may be virtually staged and published via hosting platform to a wide, or selected, audience of users 22 to be viewed.

Figure 2:
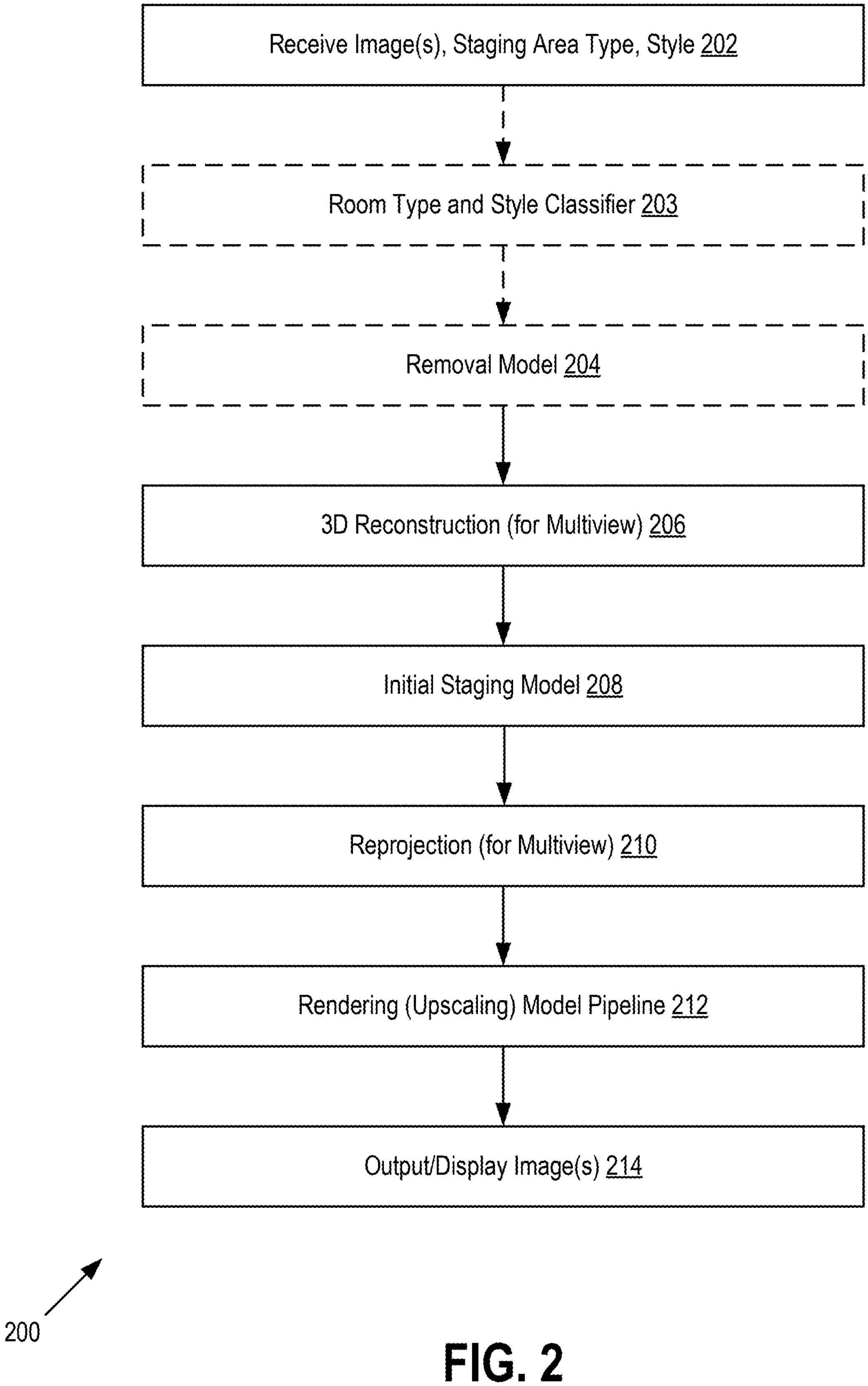
FIG. 2 illustrates a flowchart of an example methods of operation of a virtual staging platform, in accordance with an example embodiment.

FIG. 2 illustrates a flowchart of an example method 200 of operation of a virtual staging platform, in accordance with an example embodiment. The method 200 may be performed by a virtual staging platform, such as virtual staging platform 100 of FIG. 1.

In the example shown, the method 200 includes receiving input images and associated parameters (step 202). The input images may include one or more images, which may be images of empty rooms or spaces, as well as images of partially furnished rooms or spaces. In examples, the images may include two or more images of the same room or space from two different perspectives. The input may also include an identification of a room type and style theme. The room type input corresponds to a particular room furniture collection that is intended to be staged in the space, for example a bedroom, living room, kitchen, and the like. The room style corresponds to a particular furnishing style desired by a user to be employed in selecting furnishings for use in the virtual staging process. Example room styles may include a contemporary style, a classic style, a mid-century modern style, and the like.

In examples, the input of room type and style may be obtained from a user. In alternative, optional examples, a room type and style classification process may be performed to generate the input regarding room type and style (step 203). In such an instance, a classifier model may be provided an input image, and trained to output probable room type and style classifications that may be used. For example, an input image may correspond to an empty room or a room that includes furniture in it (e.g., prior to execution of a removal process on the image), and the room geometry and features, as well as optionally the furniture present in the room, may inform the classifier model regarding a possible room type to be used. Such classifier-generated room type and style inputs may be provided directly to a staging model as described herein, or may be provided back to a user via a user interface (e.g., as seen in FIGS. 9-14 below) for confirmation and/or adjustment of the room type or style classifications that are generated.

In the example shown, one or more images may be partially staged with furnishings that are not desired to be included in an end-stage virtually staged image. Accordingly, the method includes performing a removal process (step 204) to remove those undesirable furnishings from the image prior to performing virtual staging operations. The removal process may include receiving a mask identifying areas of an image that contain objects for removal, and employing an inpainting model useable to generate appropriate room content in the removed areas. The inpainting model may be a diffusion model trained with images of furnished and unfurnished rooms (e.g., the inverse of staging training data, as described below). In some instances, a plurality of images may be generated using the inpainting model, and comparisons of textures and image consistency within the masked area and outside the mask area may be performed to select the most appropriate image generated. Further details regarding removal are provided below in conjunction with FIGS. 7 and 11-12.

It is noted that in some instances, the removal process may not be required, depending on the images received by the virtual staging platform 100. For example, if the received images depict empty (e.g., unfurnished) spaces, no removal process may be required.

In the example shown, the method 200 includes generating a three-dimensional reconstruction of a space (step 206). Generating the three-dimensional reconstruction may be performed in instances where multi-view staging is desired, e.g., when two or more images of a same space are received. In this instance, a regression model may be used to generate a three-dimensional pointmaps associated with each image, and place those pointmaps in a common coordinate frame to generate a three-dimensional reconstruction of a space. In some instances, based on the pointmaps, camera positions defining perspectives from which each image is captured may be added to the three-dimensional reconstruction. This reconstruction enables consistent staging across multiple perspectives. Additional discussion of three-dimensional reconstruction is provided below in conjunction with FIG. 5.

In the example shown, a staging process (step 208) may generate a staged image using an initial staging model. The staging may generate a staged image that includes a selection and layout of virtual furnishing items within a space depicted in one of the input images. The selection and layout of virtual furnishing items may be based on the received room type input and style theme input. A diffusion model, trained using pairs of empty and furnished rooms tagged with room type and style theme data, may be used to perform the staging process. Thes tagged image may be a low-resolution staged image (e.g., at a lower resolution than an intended output image).

In the example shown, a second staging process (step 210) may be used to generate a second staged image. The second staging process may involve reprojecting the staged virtual furnishing items from the first staging process onto the second image which depicts the same space from a different perspective. For example, a monocular depth estimation may be performed on the staged image and the second image, and staged object locations may be identified from the first image in and placed in the second image. A reprojection mask may be created to identify locations at which the virtual furnishing items should appear. A second diffusion model may then be used, which accepts the empty image from a second perspective, the reprojected furnishing items, and the reprojection mask to generate a second staged image.

In examples, the first staged image and second staged image may be of relatively lower resolution as compared to a desired output image. For example, the staged images may be at a 768×512 pixel resolution, while a desired output image may be higher, e.g., 3072×2048 pixel resolution. Furthermore, additional detail may be desirable to be added to ensure a high-quality output image. Accordingly, a rendering process (step 212) applies a rendering pipeline to each image to generate high-resolution outputs. This generally includes mask generation, tiled upscaling, and application of lighting and texture effects to ensure photorealistic results, while improving detail in the images and introducing features like shadows, reflections, and surface textures. Details regarding a rendering pipeline are provided below in conjunction with FIG. 8.

In the example shown, the method 200 further includes outputting staged images for display (step 212). For single-view processing, this includes outputting the final rendered staged image. In multi-view scenarios, this includes outputting multiple consistent perspectives of the virtually staged space. The output may be provided to a user 12 who submitted the image for collection and use, or may be output to a hosting platform 20 for use and delivery to a wider population of users 22.

Figure 3A:
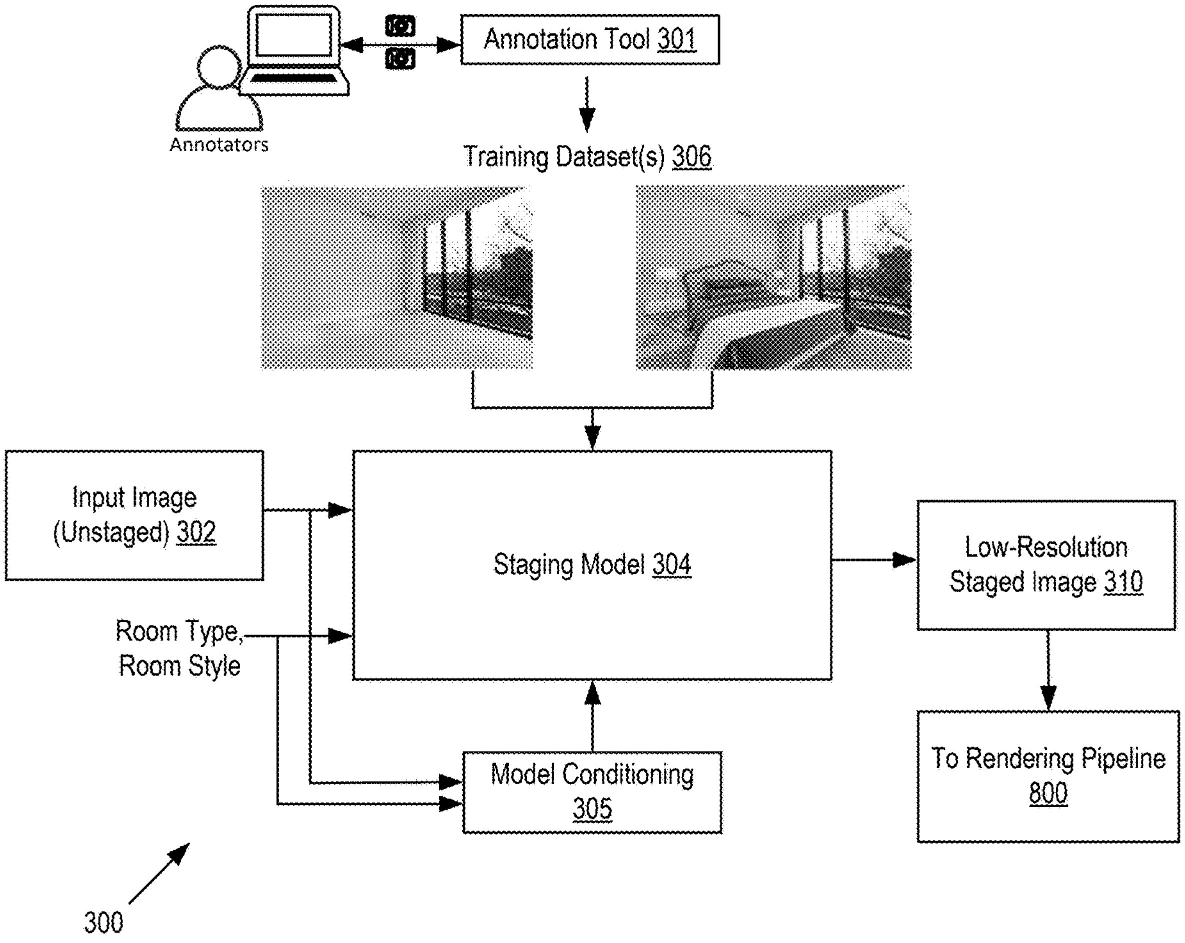
FIG. 3A illustrates a block diagram showing components of a staging model pipeline including training datasets.
Figure 3B:
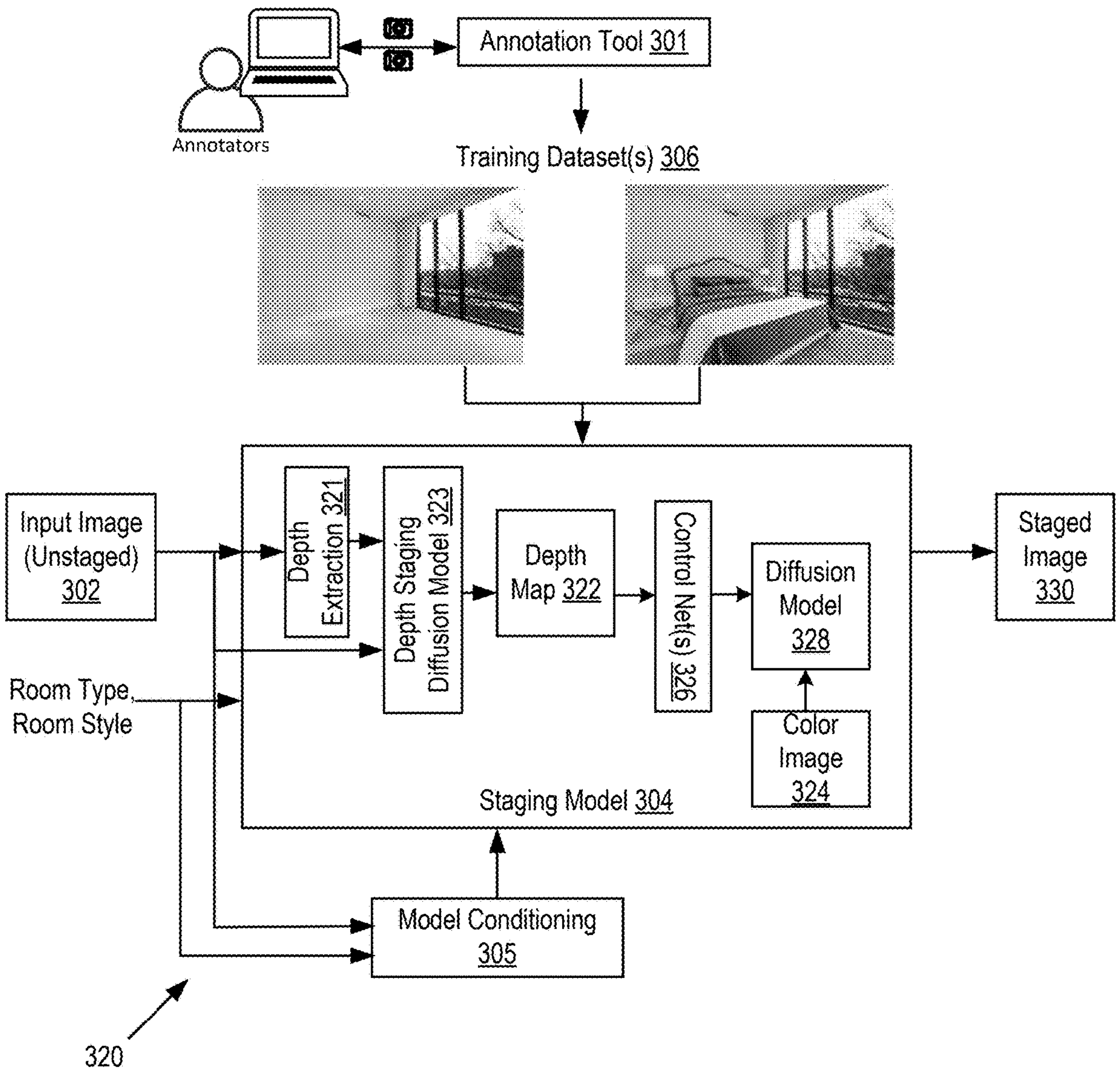
FIG. 3B illustrates a detailed block diagram showing components of an alternative staging model pipeline incorporating depth and color models with controlnets.
Figure 8:
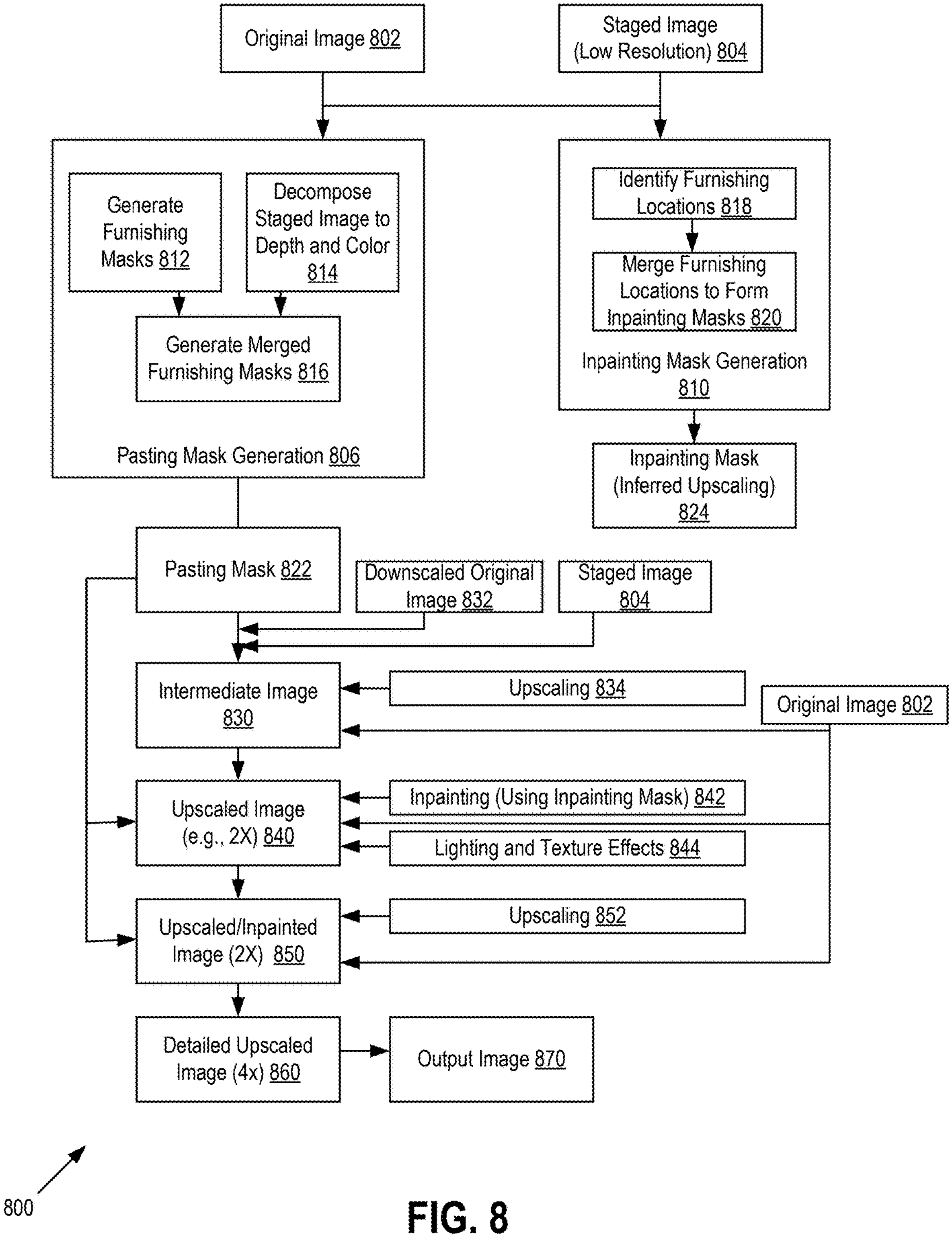
FIG. 8 illustrates a detailed block diagram showing components of a rendering pipeline including mask generation, upscaling, and texture effects, according to an example implementation.

Referring now to FIGS. 3A-3B to 8, details regarding a staging model, a removal model, and a multi-view staging process are described, including a rendering pipeline for upscaling staged images. In general, different versions of the staging and removal models may be used in different contexts, depending on the input image and desired output images.

FIGS. 3A-3B illustrate examples of a staging model pipeline, in accordance with the present application. FIG. 3A illustrates a first staging model pipeline 300 in which an input image 302 is received at a staging model 304, alongside additional inputs including a room type and room style input, as well as appropriate prompting to stage the empty input image using specific types of objects consistent with the room type and style. The staging model 304 may include a diffusion model that is, e.g., based on the Stable Diffusion 2.1 model, but trained using a training dataset 306 that includes large number of pairs of empty space and staged space images, with the staged space images being labeled by room type and style. The staging model generates a low-resolution image 310 of a staged space, which may be supplied to a rendering pipeline, such as rendering pipeline 800 of FIG. 8, for introduction of fine-grained detail and lighting/texture effects.

In the example shown, the training dataset 306 may be derived, at least in part, based on receipt of annotated images from an image annotation tool 301. The image annotation tool may guide annotator users to view image pairs and add labels to those image pairs indicative of characteristics of the staging. The characteristics of the staging may correspond to feedback regarding staging (e.g., photorealism, beauty), improvement opportunities in staging (e.g., furniture being mismatched, too large/small, and the like), image artifacts (e.g., structural elements, such as floors and walls, not being preserved faithfully). Additionally, annotator users may select and exclude image pairs from the training dataset 306 if considered to be sufficiently "bad" training data. Such a determination may be a subjective determination of the user based on closeness of the output image to a realistic image, and how true it remains to an unstaged input image.

Additionally, in some optional embodiments, a model conditioning component 305 may be employed. The model conditioning component may be implemented using a multimodal generative model capable of receiving image and text inputs, and may receive further prompting to generate strict conditions that are able to be submitted to the staging model 304 (optionally also to the individual diffusion models 323, 328 of FIG. 3B, below) to more strictly condition color schemes, layouts, and the like of furnishings that are generated via the staging model 304.

FIG. 3B illustrates an alternative staging model pipeline 320 in which the input image 302 is received at a staging model 304. Within the staging model, a depth map 322 and a color map 324 are each generated for the input image. In the example shown, the depth map is generated by performing a depth extraction process 321 on the input image 302. A diffusion model 323 receives the original image 302 and the depth map 322 to obtain a depthmap 322. The depth extraction process may be performed using monocular depth determination on the input image, and the staging process may be performed with the diffusion model 323, which is trained similarly to model 304 described above. The depth map 322 may be provided as a controlnet 326 to a diffusion model 328 that is trained and prompted similarly to the above. The diffusion model 328 also receives the colormap 324 generated from the input image 302. The one or more controlnets may be implemented as neural networks, and used to constrain image generation in the diffusion model 328 by adding conditions on the images that are generated from such a model. By separating depth and color information and using those features to independently condition the diffusion model 328, improved consistency in layout of virtual furnishing items from the diffusion model may be achieved. The staging model pipeline 320 may generate a staged image 330, which is similar to the staged image 310. As such, in examples, the staged image 330 may similarly be supplied to a rendering pipeline, such as rendering pipeline 800 of FIG. 8, for upscaling and introduction of fine-grained detail and lighting/texture effects.

Figure 4A:
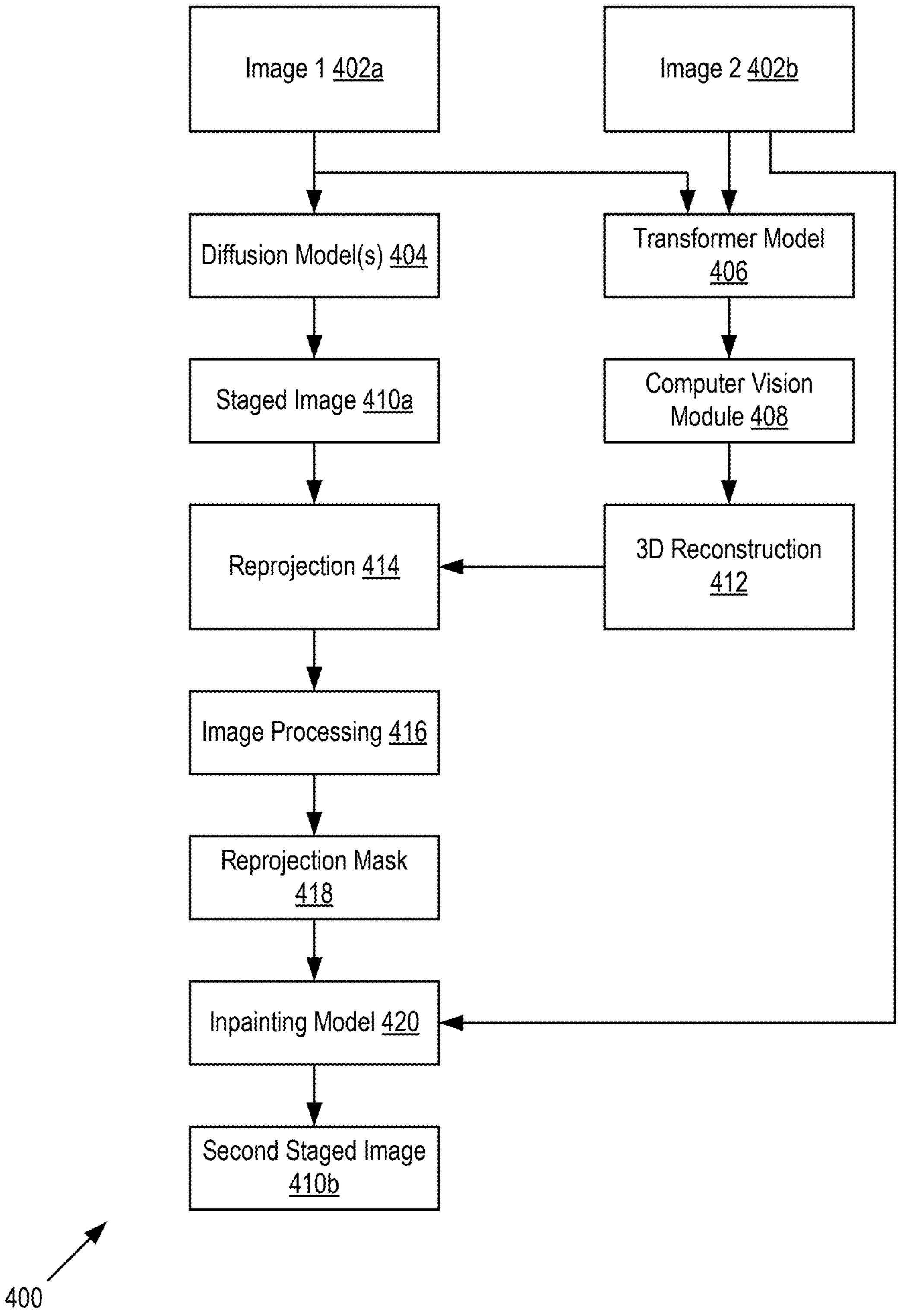
FIG. 4A illustrates a block diagram showing components of a multi-view staging pipeline including transformer model, computer vision module, and reprojection processes.

FIG. 4A illustrates a block diagram showing an overall process 400 used for multi-view staging. The overall process 400 as illustrated involves use of a transformer model, generative staging models and computer vision modules, and reprojection processes.

In the example implementation shown, first and second images 402*a-b* are received. The first and second images 402*a-b* are images of the same space captured from two different perspectives. In this context, both of the first and second images are images of empty spaces (e.g., unstaged). The first image 402*a* is provided as input to one or more diffusion models 404, such as the staging models described above in conjunction with FIGS. 3A-3B to generate a staged image 410*a*. Additionally, both of the first and second images 402*a-b* are provided to a transformer model 406. The transformer model 406 implements a three-dimensional reconstruction process to generate a three-dimensional pointmap associated with each image. Generally speaking, the transformer model assigns each point in the pointmap corresponds to a depth and pixel value. The pointmaps are overlayed using transformer decoders with cross-attention mechanisms to generate an output of two pointmaps in a common coordinate frame to generate a three-dimensional reconstruction of a space. The transformer model may be a regression model, in some instances. In example implementations, the three-dimensional reconstruction may be based on an algorithm and modeling approach described in "DUSt3R: Geometric 3D Vision Made Easy", by Wang et al., Proceedings of the IEEE/CVF Conference on Computer Vision and Pattern Recognition, 20697-20709, the disclosure of which is hereby incorporated by reference in its entirety.

As illustrated, a computer vision module 408 determines positions of the cameras used to capture the two images in the 3D space. For example, various camera position and pose estimation techniques may be used (e.g., some combination of Perspective-n-Point and Random Sample Consensus (RANSAC) processes) to obtain a camera pose estimation. Other camera pose determination processes may be used as well.

Figure 5:
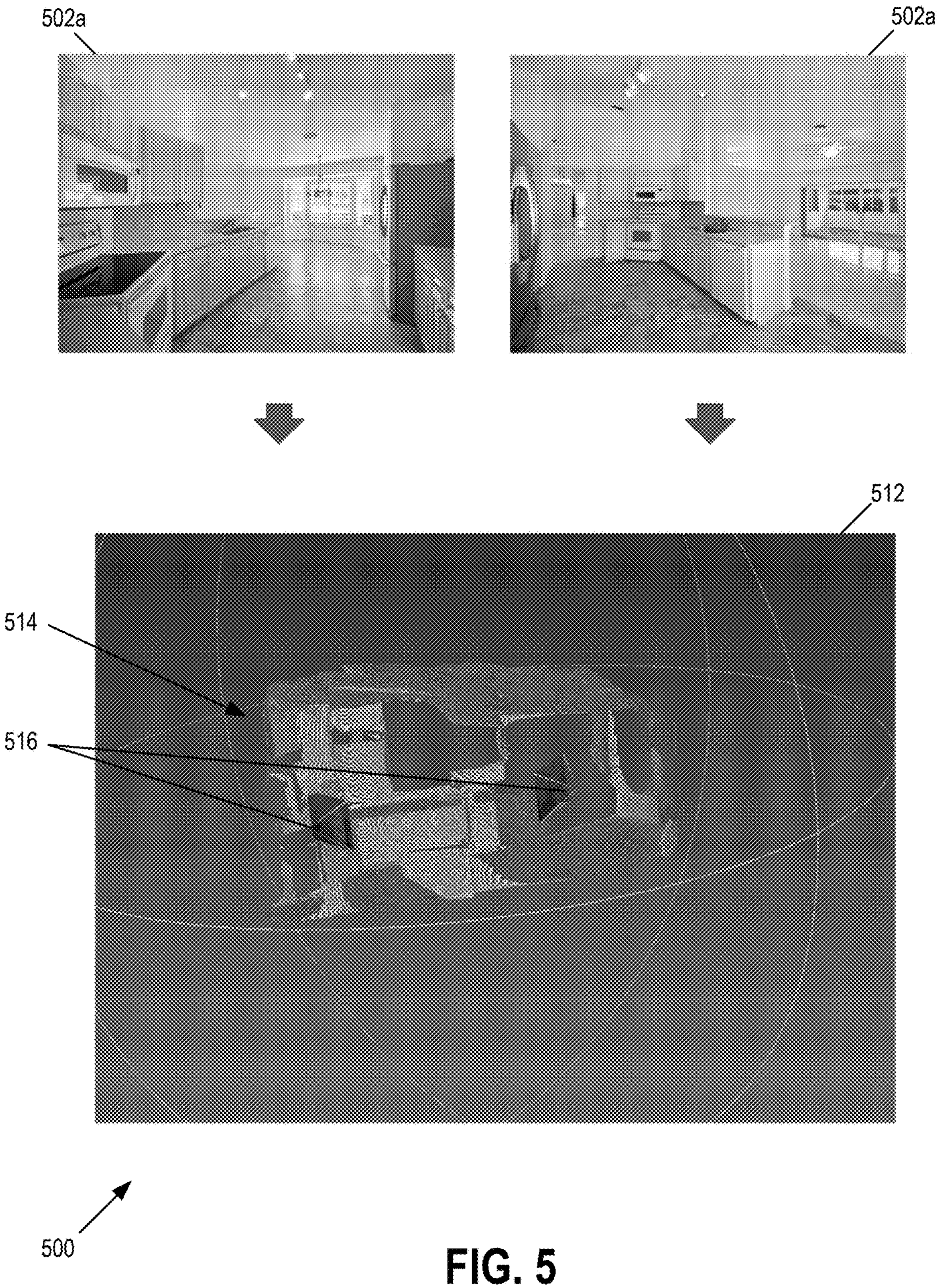
FIG. 5 illustrates an example 3D projection generated from input images, in accordance with an example implementation described herein.

From the transformer model 406 and computer vision module 408, a 3D reconstruction 412 is created. An example of such a 3D reconstruction is shown in FIG. 5. The 3D reconstruction 412 may be used with the staged image 410*a* to perform a reprojection 414. The reprojection 414 translates and rotates the staged furniture in the first image 410*a* onto the second image 410*b*. Specifically, the furnishings that were added to the first image by the initial staging process are re-projected from the perspective of the second image within the second image to generate a re-projected view of the generated furniture. An image processing component 416 creates a reprojection mask 418 from the reprojection 414. The reprojection 414, reprojection mask 418, and second image (unstaged) 402*b*) are then provided to an inpainting model 420. The inpainting model is a custom latent diffusion model that generates furniture in the second image 402*b* in a manner consistent with the furniture in the first staged image 410*a*. The reprojection 414 and reprojection mask 418 act as constraints on the diffusion model, alongside appropriate prompting, providing input regarding the location and selection of furniture to be staged within the second image 402*b*. From this, a second staged image 410*b* may be generated.

In example implementations, after the first staged image and the second staged image are generated, a rendering module may be employed to upscale the images to provide highly detailed output images. For example, the staged images 410*a-b* may be at a lower pixel resolution (e.g., 768×512), while a desired output image may be a higher, e.g., 3072×2048 pixel resolution, with higher level detail. Details regarding such a rendering module are provided below in conjunction with FIG. 8. Generally speaking, the rendering operation performed applies an image segmentation module, an object detection module, and one or more diffusion models. The image segmentation module and object detection module determine a layout and structure of the virtual furnishing items, and generate one or more control constraints provided to the one or more diffusion models used to generate the higher-resolution representations.

Additionally, while in the example shown a specific order of operations is provided, it is recognized that certain operations may be performed in other orders or may be duplicated. For example, in some instances, multiple staged images 410*a-b* may be generated and used in the multiview staging process, with a user enabled to view and select a most accurate version therefrom.

Furthermore, rather than staging the second image perspective using a reprojection and reprojection mask, in some instances, a model may be employed that receives initial images 402*a-b*, a staged image 410*a* that is represented as both an RGB image and a semantic segmentation map, and a reprojection 414 implemented as an RGB image and as a semantic segmentation map. This may generate staged image 410*b* as well as a revised version of staged image 410*a*. Accordingly, greater consistency among the staged furnishings across images 410*a-b* may be achieved, in some instances.

Additionally, in further example implementations, more than two images may be used. In such instances, more than two pointmaps may be generated as part of the 3D reconstruction, and each unstaged image may be staged using reprojections and reprojection masks. Additionally or alternatively, for two images having similar perspectives, rather than regenerating a staged scene using a diffusion model, other image modification techniques might be used to adjust perspective of the staged furniture.

Figure 4B:
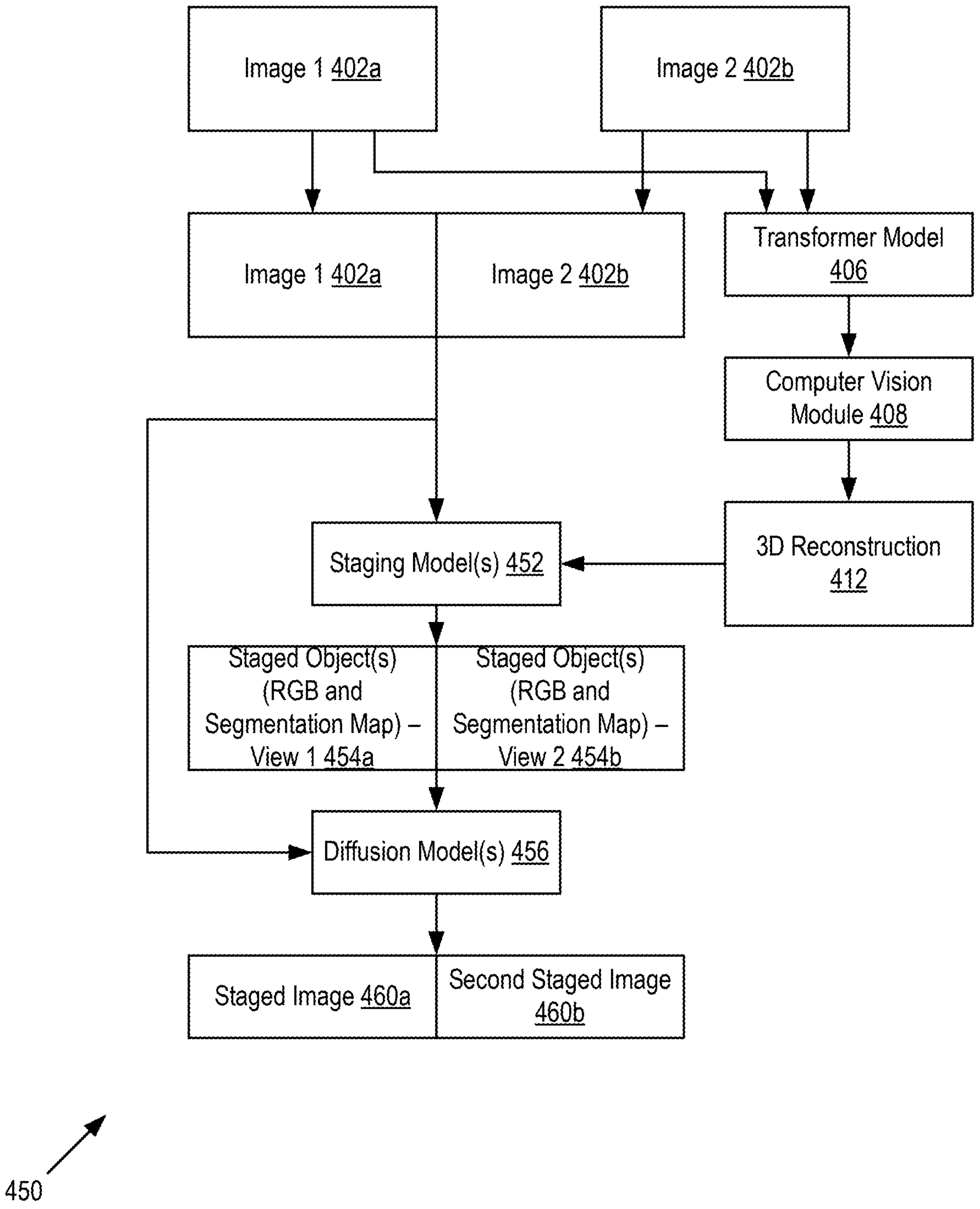
FIG. 4B illustrates a block diagram showing components of a multi-view staging pipeline using a joint staging approach.

FIG. 4B illustrates an alternative multiview staging pipeline 450, according to a further example embodiment. This example jointly generates the staged images from two input (unstaged) images 402*a-b*. As illustrated, the input images 402*a-b* are generally used to generate a 3D reconstruction 412 in the manner described above. However, rather than staging a first image and reprojecting staged items into the second image as in FIG. 4A, here, the input images 402*a-b* are concatenated with each other, and provided to an initial staging model 452, which uses the concatenated image and 3D reconstruction to generate initial staged objects 454*a-b*, in the form of concatenated RGB images and semantic segmentation maps identifying the specific locations of objects within the image. In this example, the concatenated original images 402*a-b*, as well as the staged objects 454*a-b*, are provided to a further diffusion model that uses the staged objects 454*a-b* as controlnets on the diffusion model 404 that is used to generate a staged image, which is a concatenation of staged images 460*a-b*. Because the staged images 460*a-b* are generated concurrently within the diffusion model 456, better object generation consistency is obtained across the views.

FIG. 5 illustrates an example 3D projection 500 generated from input images, in accordance with an example implementation described herein. The 3D projection 500 takes two input images, shown as multiview images 502*a-b*, and generates a 3D model 512 that includes a pointmap 514 including pixels assigned positions in 3D space. The 3D model 512 may also include location indicators 516 corresponding to camera positions, which may be obtained from image processing techniques. Such a 3D model 512 may be generated, for example, using the transformer model 406 and computer vision module 408 described above in conjunction with FIG. 4A.

Figure 6:
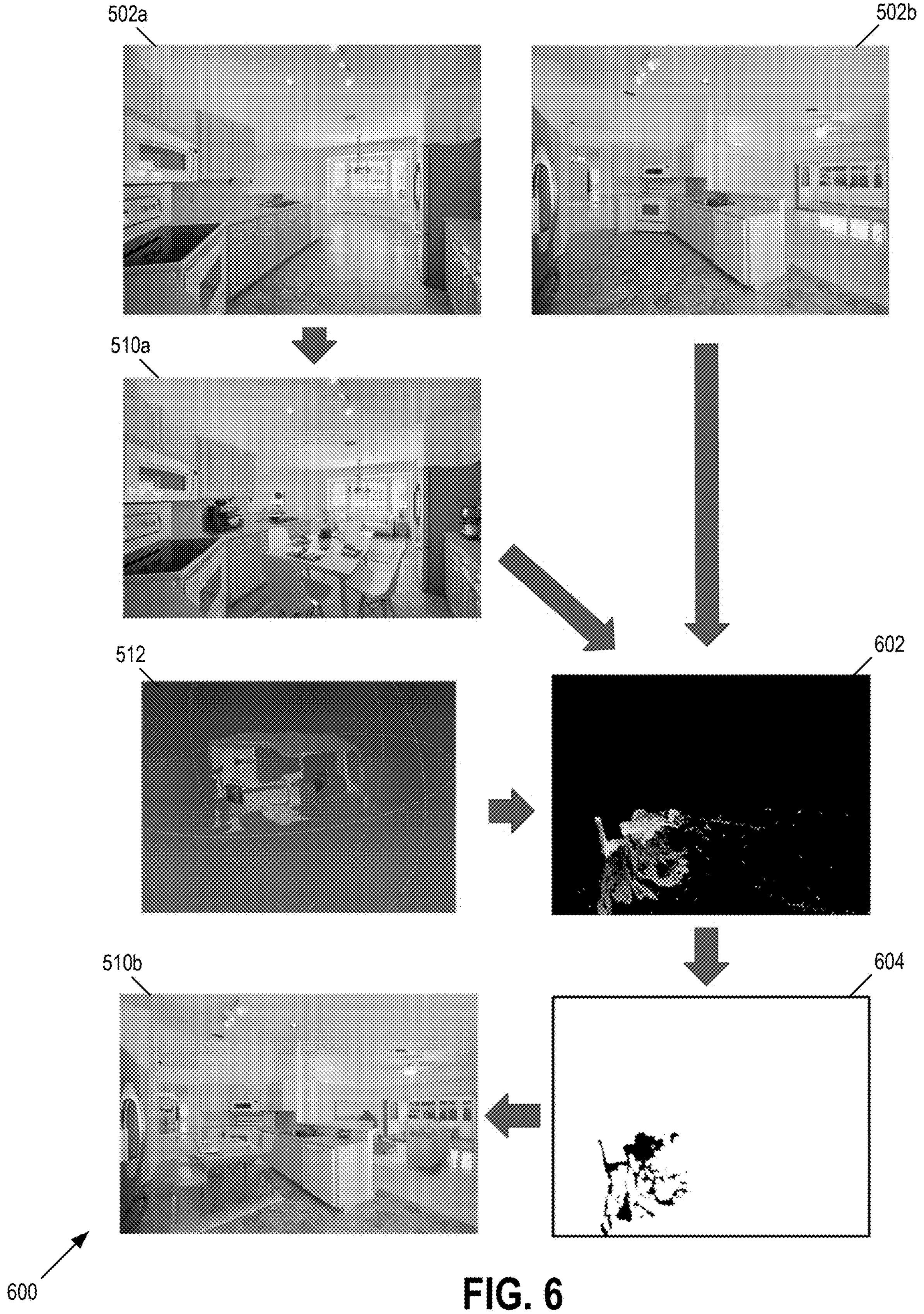
FIG. 6 illustrates an example multiview virtual staging sequence, according to an example implementation.

FIG. 6 illustrates an example multiview virtual staging sequence 600, according to an example implementation. The multiview virtual staging sequence 600 illustrates a particular example of image objects used to generate staged images in accordance with the process 400 of FIG. 4A. In the example shown, two input images 502*a-b*, representing images from two perspectives of a kitchen, are provided. A staging process is performed on input image 502*a* to generate an initial staged image 510*a*. Additionally, a reprojection 512 is generated in accordance with the methods described above, and as illustrated in FIG. 5. The initial staged image 510*a*, the second image 502*b* (unstaged), and the 3D model 512 are used to generate a reprojection 602 of the furniture from the first staged image 510*a* into a perspective obtained from the second input image 502*b*. The reprojection 602 may then be used to generate a reprojection mask 604, which is a binary value mask indicating positions in which furniture has been projected onto the second input image 502*a*. This reprojection mask 604 may be used, alongside the reprojection 602 itself, and the second input image 502*b*, to generate a second staged output image 510*b*.

As mentioned above with respect to FIGS. 4A-4B, output images 510*a-b* may be, in some instances, generated at a lower level of detail and/or resolution than desired for use in some applications, such as virtual reality, furnishing display, and/or real estate listing settings. Accordingly, as with the single-view staging process, an upscaling process may be performed on the output images 510*a-b* to generate upscaled images. Because the upscaling process uses a series of masks and constraints to ensure consistency during upscaling, the output images 510*a-b* are upscaled in a manner that is generally consistent with each other to render photorealistic views of a staged scene from multiple perspectives.

Figure 7:
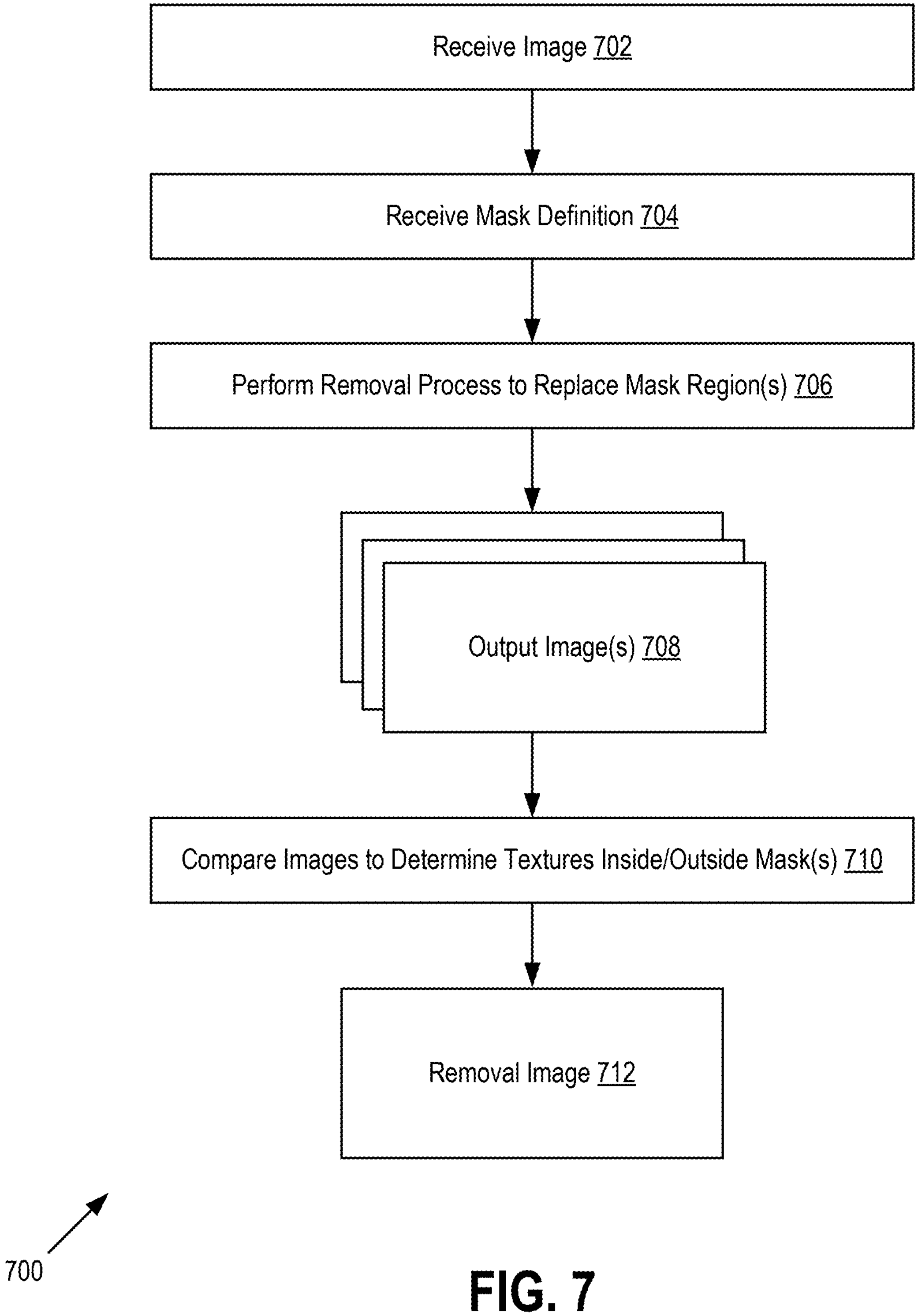
FIG. 7 illustrates a flowchart of an example removal process, according to an example implementation.

Referring to FIG. 7, a flowchart of an example removal process 700 is shown, in accordance with an example implementation. The removal process may be used to preprocess one or more received images of rooms or other scenes to remove unwanted furnishings from those images prior to performing virtual staging processes. In some instances, the removal processes may be performed independently to generate empty room or empty scene images.

In the example illustrated, the removal process 700 involves receiving one or more images (step 702), for example from a user 12 at virtual staging platform 100 as seen in FIG. 1. The method further includes receiving a mask definition (step 704). Receiving a mask definition may involve displaying the image to the user via a user interface and allowing the user to select one or more regions that include furnishings that the user wishes to remove. Such mask creation user interfaces may be as displayed in FIGS. 11-12.

In the example shown, a removal process is performed to replace the masked regions (step 706). The removal process may be implemented using an inpainting model that utilizes the Stable Diffusion 2.1 architecture. Such an inpainting model accepts a binary mask identifying areas containing objects to be removed (e.g., the mask defined by a user in the mask definition process), and generates content to fill those areas. In example implementations, the inpainting model uses a LORA (low-rank adaptation) approach to keep base model weights frozen while fine-tuning behavior, and is trained on a reverse dataset to the staging model—pairs of staged and unstaged (empty) room images, thereby training the model on how to, with appropriate prompting to maintain surface textures, dimensions, and the like, effectively remove furniture and generate appropriate room content.

In some instances, prior to performing the removal process, one or more additional models may be used to detect characteristics of the image. For example, a segmentation model may be used to perform an initial object detection (e.g., to detect furniture items in the image, which may guide the mask generation process). Such a segmentation model may also be trained for clutter detection, such that clutter items may be identified within potential mask areas or otherwise identified to a user as desirable to remove from a scene).

In some examples, an alternative version of the removal process may be performed in which depth information is obtained for the input image, for example, using monocular depth estimation techniques. In this instance, furniture may be removed in depth space without the mask, and then depth information may be used to assist the inpainting process (e.g., to perform inpainting in a manner that is consistent with neighboring regions at similar depth). This approach may result in better maintenance of correct room geometry during the inpainting process, particularly when large pieces of furniture are removed that otherwise might occlude large portions of windows and/or walls.

In the example illustrated, a series of output images 708 are generated. A selection process is performed (step 710) in which textures within and outside the masked regions are analyzed for consistency. For example, second derivatives of textures may be analyzed, and statistical properties of the image regions compared (e.g., Laplacian texture analysis), to ensure consistency inside and outside of the masked and replaced area. For example, such analysis may avoid issues in which a rough surface (e.g., carpet) may be generated in the masked region while a hardwood or other smoother flooring surface remains in the unmasked region. Based on the analysis of a variety of textural elements and consistency at edges of the mask, a best candidate removal image may be automatically selected from among the output images 708, and designated as the removal image 712.

In some examples, the selection process involves user analysis of the output images 708 as well. For example, the candidate output images 708, or a subset thereof, may be presented to a user for selection of a best candidate output image. The selection of this best candidate output image may be further used, in conjunction with the received input image, as part of subsequent training data for the removal model used in step 706.

FIG. 8 illustrates a detailed block diagram showing components of a rendering pipeline 800. The rendering pipeline 800 as illustrated includes mask generation, upscaling, and texture effects, according to an example implementation. In the example as illustrated, the rendering pipeline 800 receives an original image 802, as well as a staged image 804. The staged image 804 may correspond to a lower resolution staged image, while the original image may be a higher resolution image. As illustrated, the original image 802 and staged image 804 are provided to a pasting mask generation component 806 and an inpainting mask generation component 810.

The pasting mask generation component 806 generates one or more furnishing masks based on positions of furnishings included in the staged image 804 (at operation 812). Additionally, the staged image may be decomposed into depth and color components (at operation 814). Based on the furnishing masks, and depth and color information, a set of merged furnishing masks may be generated (at operation 816). Accordingly, the pasting mask generation component 806 generally detects positions of the furniture added in the staged image 804 relative to the original image 802, and therefore defines areas of the original image 802 that should remain unchanged during the upscaling process.

The inpainting mask generation component 810 also identifies locations of the furnishings that were added in the staged image 804 (at operation 818), and merges the furnishing locations to form one or more inpainting masks (at operation 820). The inpainting masks generally define areas in which upscaling may be performed on the objects in the staged image (e.g. added furnishings), which may in turn be placed within the higher-resolution original image using the pasting mask(s).

Generally speaking, the pasting mask generation component 806 and inpainting mask generation component are used to preserve the original room structure using the pasting mask, while re-injecting areas that should not be changed during each diffusion step of the rendering pipeline (via the pasting mask). Generation of new furniture content in specific areas may be guided by the inpainting mask, while maintaining consistency between the original room and newly-generated virtual furnishings.

In the specific example shown, a pasting mask 822 generated by the pasting mask generation component 806 may be used, in combination with the original image 802 and staged image 804 to generate an intermediate image 830. The intermediate image may be a lower-resolution image that is based on a downscaled image 832 that is obtained from the original image 802, the staged image 804, and the pasting mask 822 to ensure that the unstaged portions of the image remain preserved.

An upscaled image 840 is generated by performing an upscaling process 834 on the intermediate image 830. The upscaling process 834 may utilize a generative adversarial network (GAN) based upscaler. The upscaling process may utilize the original image 802 as reference to generate the upscaled image. The upscaled image 840 may have a higher (e.g., double) resolution relative to the staged image 804 and downscaled original image 832.

An inpainting process 842 may be applied to the upscaled image 840, as further informed by lighting and texture effects 844 obtained from the original image 802 and/or original staged image 804, to generate a further detailed and upscaled image, shown as upscaled image 850. The upscaled image 850 may be the same resolution as image 840, and may include additional lighting and detail effects as provided by the inpainting model 842.

In a further example, the image 850 may be upscaled using a further upscaling process 852, in combination with the original image 802, to generate a detailed upscaled image 860. The detailed upscaled image 860 may be of twice the resolution as the upscaled image 840, and of a same resolution as input image 802.

An output image 870 may then be created based on the detailed upscaled image 850, as well as the original image 802 (unstaged). Creation of the detailed upscaled image 860 and the output image 870 may be controlled, e.g., via the pasting mask 822, to ensure that inpainting occurs only with respect to the regions of the original image 802 that are staged. That is, the diffusion processes performed to generate the upscaled image 850 and/or detailed upscaled image 860 may be constrained to regions in which staged furnishings are added to the image by the inpainting mask, and the pasting mask 822 may limit such upscaling to those regions by ensuring that regions outside of the pasting mask are consistent with the original image 802.

In some instances, the image processing, in particular upscaling processes, may be performed by decomposing one or more images into tiles, with each image being separated into overlapping tiles and each time separately processed through a diffusion model to perform upscaling. The tiles may be defined to have an overlap region which is compared and maintained consistent between the tiles to ensure overall image consistency. Additionally, linear interpolation is performed to blend predictions in latent space after each diffusion step to ensure consistency among the tiles. The use of tiling allows for efficient inferencing on images having a larger effective resolution using models trained on low resolution images, thereby achieving finer details in images in a more efficient manner; the linear interpolation ensures consistency across the entirety of the image.

Figure 9:
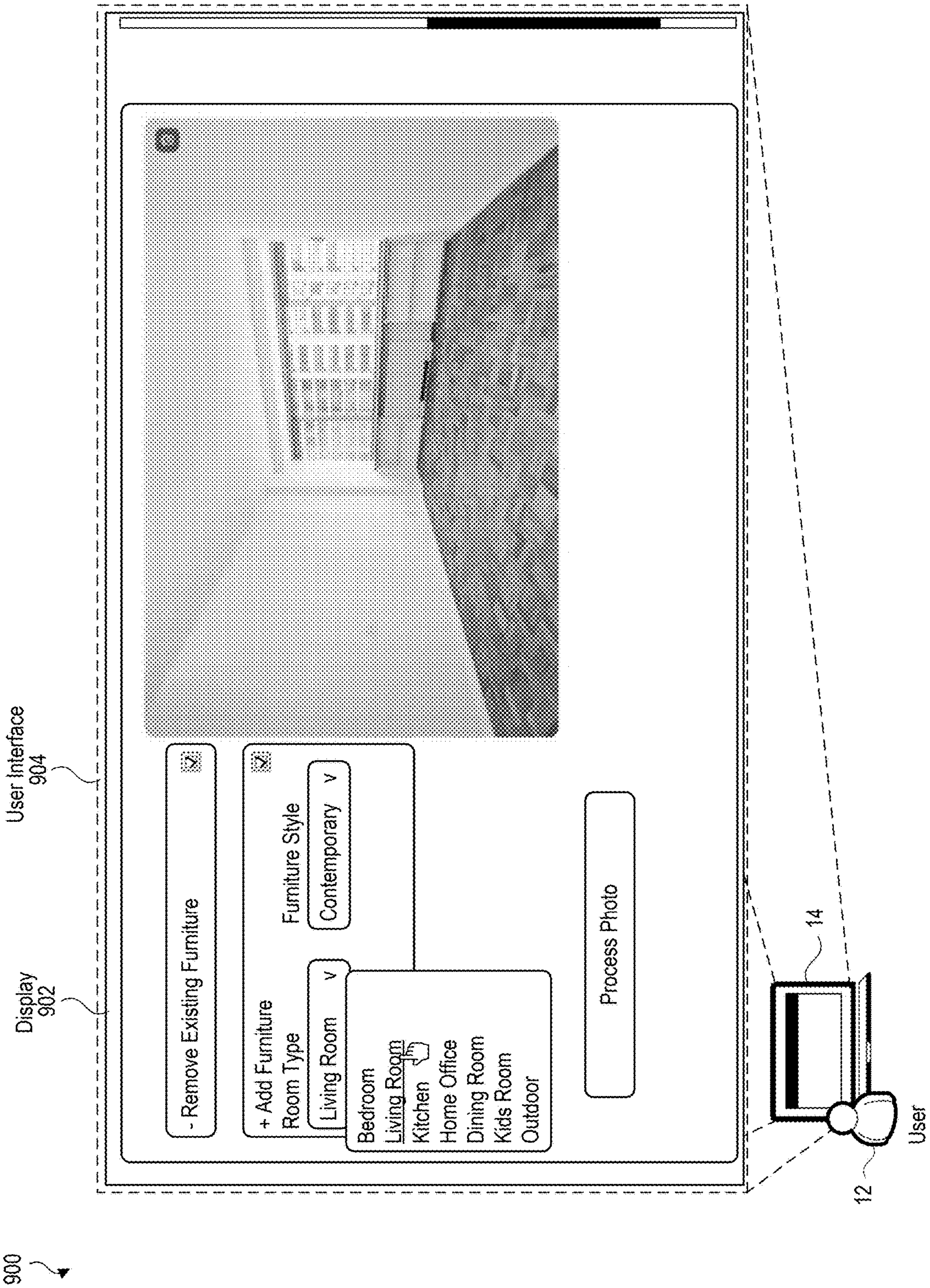
FIG. 9 illustrates an example user interface for selecting room type and furniture style parameters used in a virtual staging process, according to an example implementation.

FIG. 9 illustrates an example user interface 904 depicts a staging options screen 900 for selecting room type and furniture style parameters used in a virtual staging process, according to an example implementation. In the example shown, the screen 904 is presented on a display 902, for example on a computing device 14 of a user 12 wishing to perform a virtual staging process using virtual staging platform 100.

In the example shown the user interface 904 presents the staging options screen 900, which allows a user to select whether to remove existing furniture or add new furniture within the scene depicted in an uploaded image. As illustrated, the staging options screen 900 includes selectable options for choosing a room type and a room style. Once selected, the user may choose to proceed with processing the photo, causing a staging process to be performed.

Figure 10:
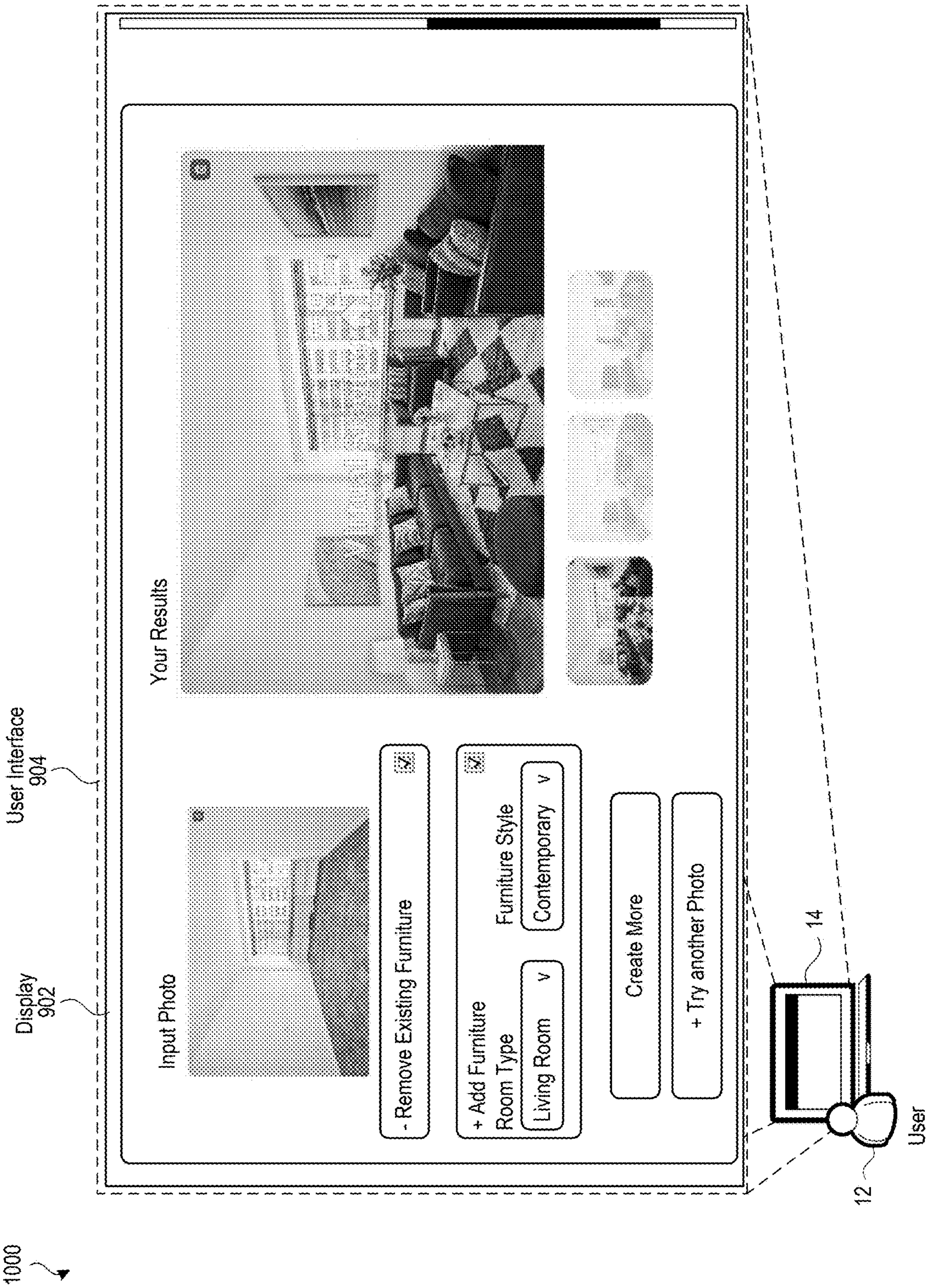
FIG. 10 illustrates an example user interface showing input and output images for virtual staging in a single perspective, according to an example implementation.

FIG. 10 illustrates an example user interface 904 showing a staged room screen 1000. The staged room screen 1000 may be displayed as a result of selecting to process the photo in the staging options screen 900. In this example, one or more selectable, staged images may be presented to the user to be selected. Additionally, the user may choose to change the input room type or style options, and regenerate or restage the input image to create other versions of the staged room. As illustrated, each of the generated, staged room images may be preserved and presented within the staged room screen 1000, allowing the user to navigate among them and select a desired one or more staged room images for use.

Figure 11:
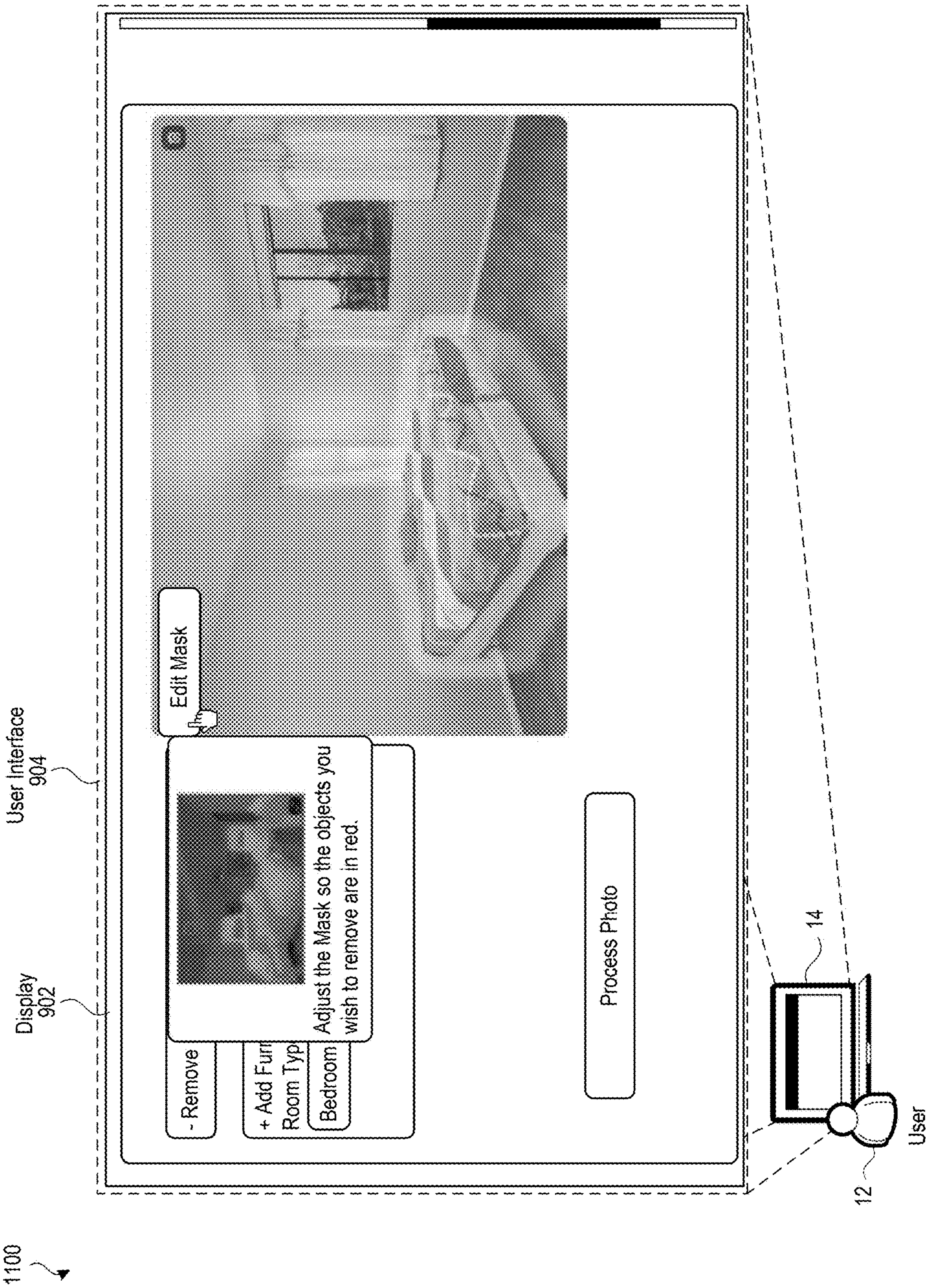
FIG. 11 illustrates an example user interface for defining removal masks to be used in a virtual removal process as described herein.
Figure 12:
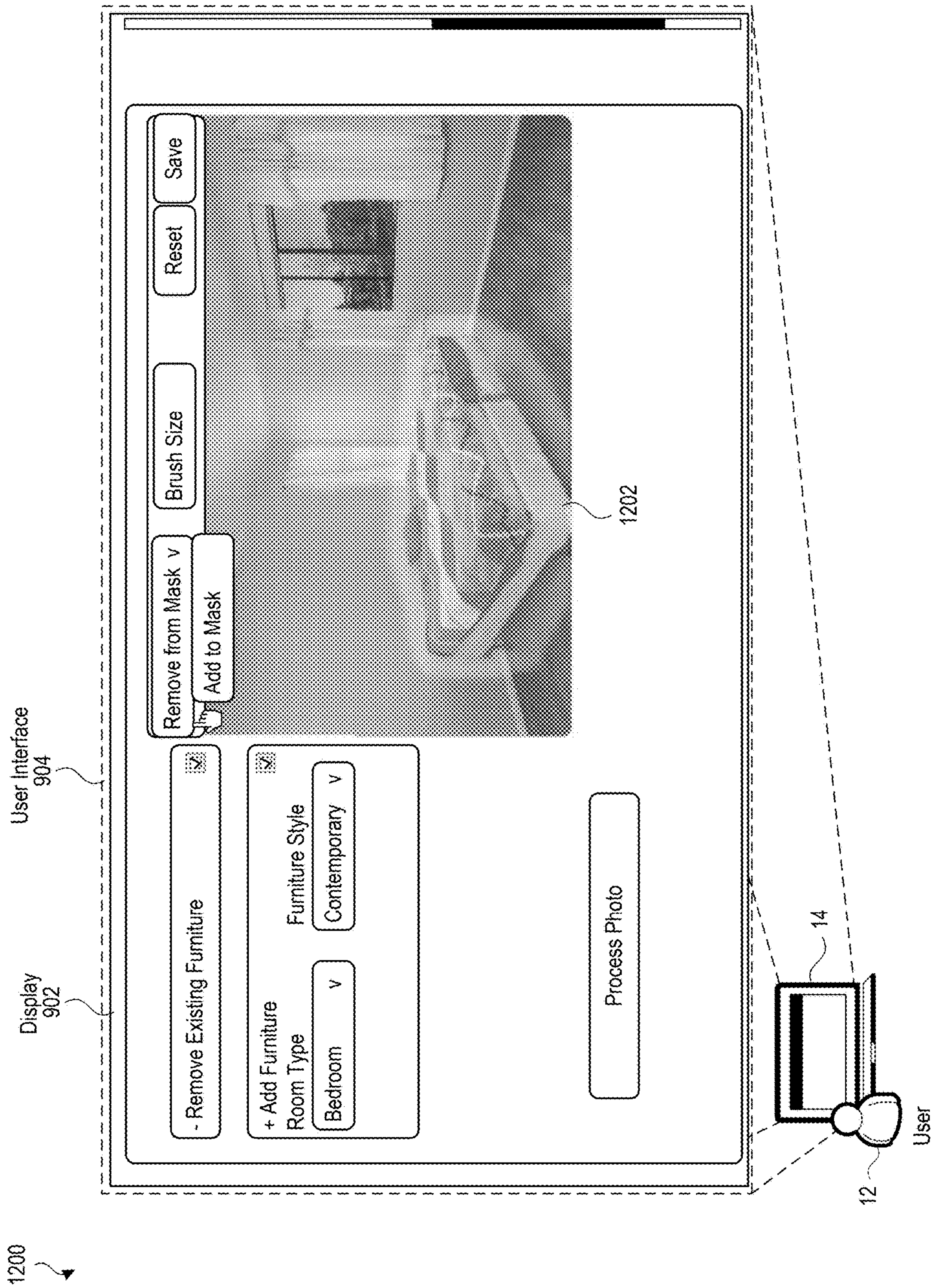
FIG. 12 illustrates an example user interface showing mask editing tools used in defining removal masks as illustrated in FIG. 11.

FIG. 11 illustrates the user interface 904 presenting a removal mask screen 1100 to be used in a removal process as described herein. The removal mask screen 1100 displays and uploaded image, as well as an edit mask option. Upon selection of the edit mask option, a removal mask definition screen 1200 as shown in FIG. 12 is presented. The removal mask definition screen 1200 includes a set of mask definition tools, including options to add to or remove from a mask, change a brush size, and the like, thereby allowing a user to define a particular region of the image to which a mask should be applied. In the example shown, the portion of the image to which the mask is applied is highlighted in a slightly lighter color relative to its original color within the image (shown as mask area 1202).

Figure 13:
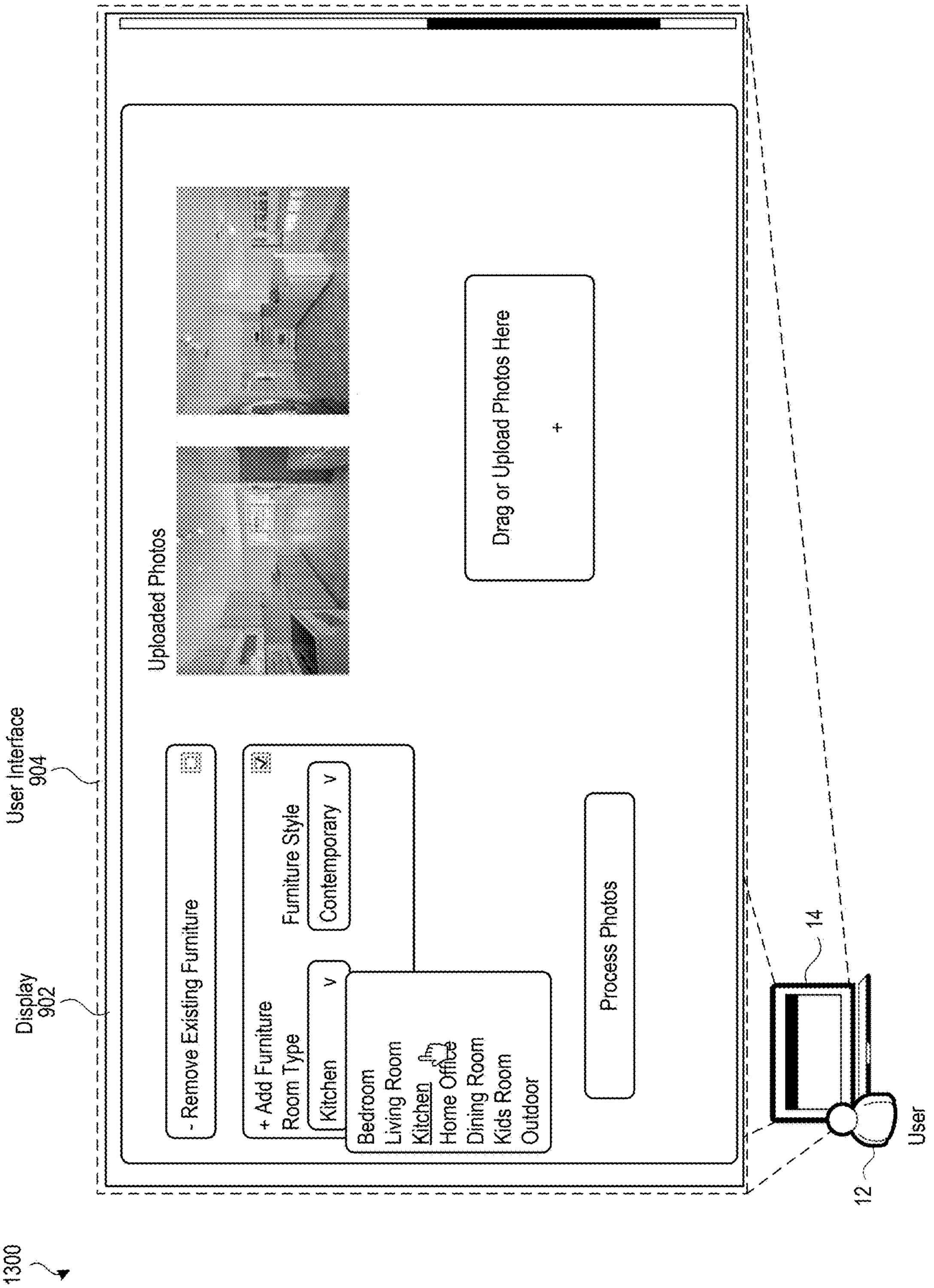
FIG. 13 illustrates an example user interface for uploading multiple images for multi-view staging, according to an example implementation.
Figure 14:
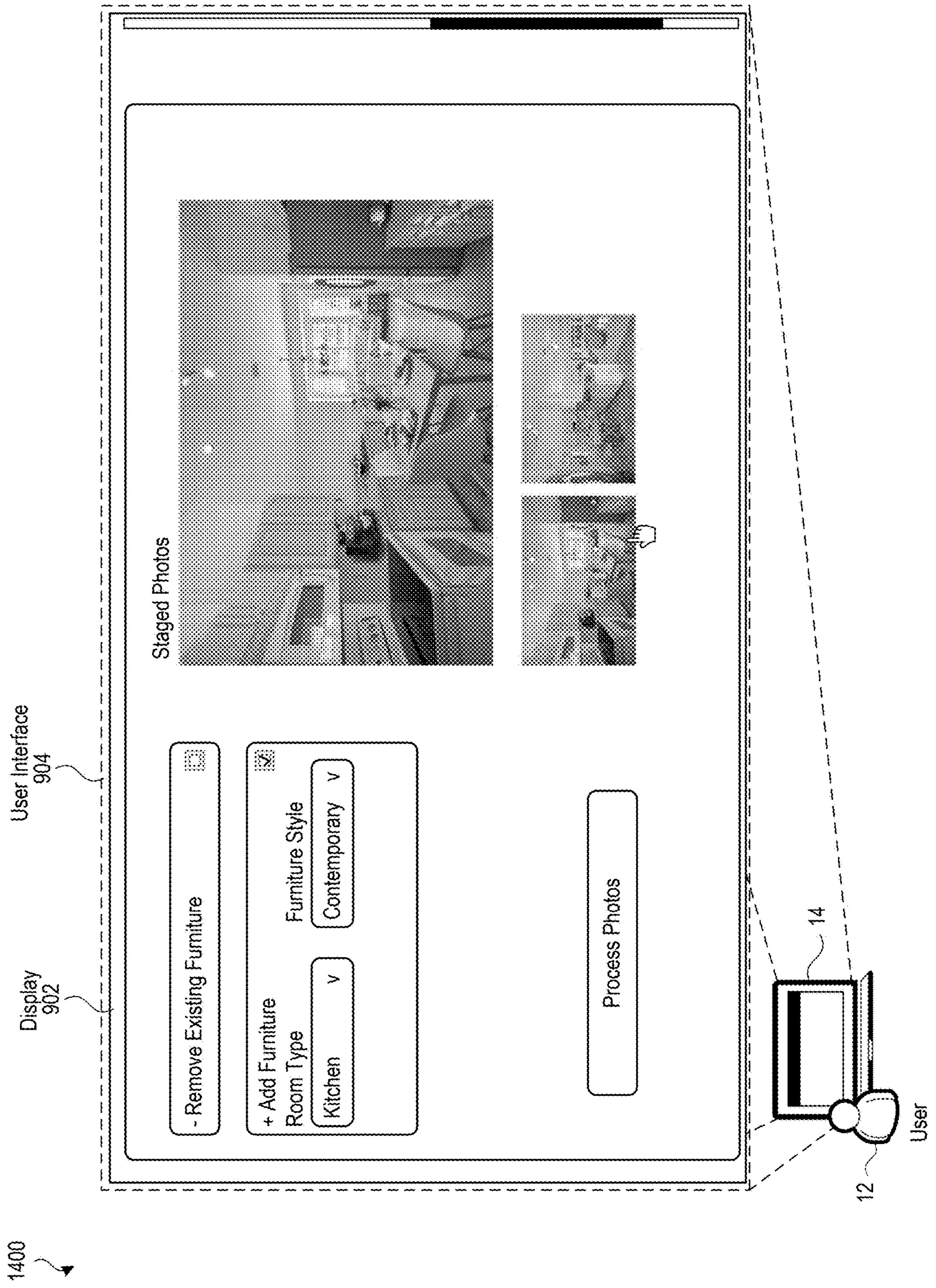
FIG. 14 illustrates an example user interface showing staged output images from multiple perspectives that may be generated in accordance with the multi-view virtual staging processes described herein.

FIGS. 13-14 illustrate presentation of multi-view staging screens within the user interface 904. In particular, FIG. 13 illustrates a multiview image upload screen 1300, in which a user may upload two or more photos of a particular space, which are taken from multiple perspectives. The images may be dragged and dropped or otherwise uploaded to the virtual staging platform 100 via the screen 1300. Additionally, as with single view staging, a user may select a room type (in this case "Kitchen") and furniture style (in this case "Contemporary") for staging use. FIG. 14 illustrates a multiview staging result screen 1400, depicted within the user interface 904. The multiview staging result screen 1400 depicts the staged images of the space, and presents miniature images of each of the provided perspectives, with an active selected image being presented in a more prominent location for detailed view by the user. The user may then quickly navigate among the various generated images to inspect consistency among the images and perform various reprocessing steps as may be desired.

Referring to FIGS. 9-14 generally, it is noted that the user interface as depicted is only intended as exemplary, and that other types of user interfaces and screens may be implemented as well. Furthermore, once a user has obtained a staged image, that image may be saved by the user at user computing device 14. The image may be provided from the user computing device 14 to a hosting platform (e.g., hosting platform 20 of FIG. 1) or may be exported directly from the virtual staging platform 100 thereto.

Figure 15:
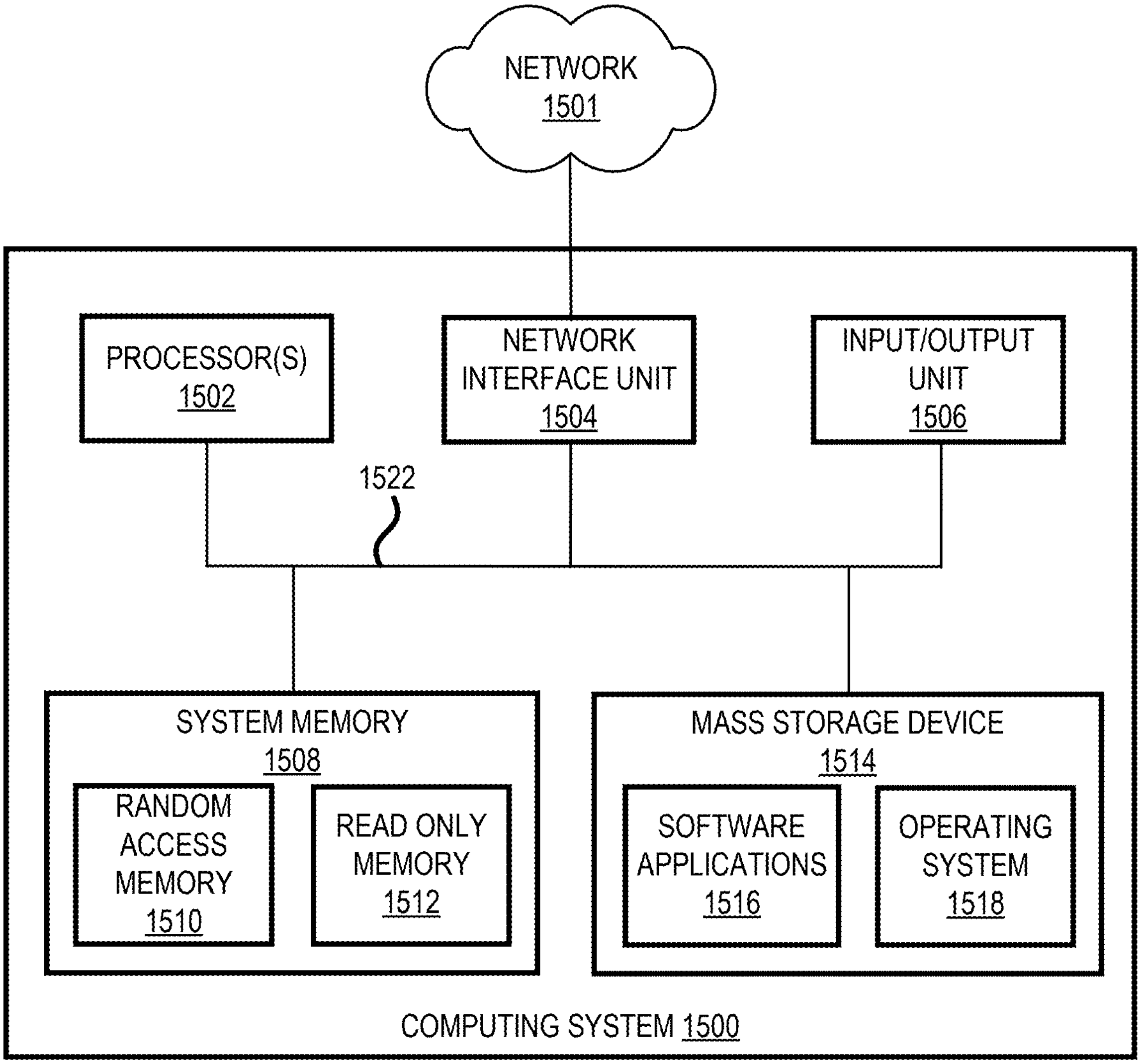
FIG. 15 illustrates an example computing device on which examples of the audience management platform may be implemented.

FIG. 15 illustrates an example block diagram of a virtual or physical computing system 1500. One or more aspects of the computing system 1500 can be used to implement the systems described herein, store instructions described herein, and perform operations described herein.

In the embodiment shown, the computing system 1500 includes one or more processors 1502, a system memory 1508, and a system bus 1522 that couples the system memory 1508 to the one or more processors 1502. The system memory 1508 includes RAM (Random Access Memory) 1510 and ROM (Read-Only Memory) 1512. A basic input/output system that contains the basic routines that help to transfer information between elements within the computing system 1500, such as during startup, is stored in the ROM 1512. The computing system 1500 further includes a mass storage device 1514. The mass storage device 1514 is able to store software instructions and data. The one or more processors 1502 can be one or more central processing units or other processors.

The mass storage device 1514 is connected to the one or more processors 1502 through a mass storage controller (not shown) connected to the system bus 1522. The mass storage device 1514 and its associated computer-readable data storage media provide non-volatile, non-transitory storage for the computing system 1500. Although the description of computer-readable data storage media contained herein refers to a mass storage device, such as a hard disk or solid-state disk, it should be appreciated by those skilled in the art that computer-readable data storage media can be any available non-transitory, physical device or article of manufacture from which the central display station can read data and/or instructions.

Computer-readable data storage media include volatile and non-volatile, removable, and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1500.

According to various embodiments of the invention, the computing system 1500 may operate in a networked environment using logical connections to remote network devices through the network 1501. The network 1501 is a computer network, such as an enterprise intranet and/or the Internet. The network 1501 can include a LAN, a Wide Area Network (WAN), the Internet, wireless transmission mediums, wired transmission mediums, other networks, and combinations thereof. The computing system 1500 may connect to the network 1501 through a network interface unit 1504 connected to the system bus 1522. It should be appreciated that the network interface unit 1504 may also be utilized to connect to other types of networks and remote computing systems. The computing system 1500 also includes an input/output controller 1506 for receiving and processing input from a number of other devices, including a touch user interface display screen, or another type of input device. Similarly, the input/output controller 1506 may provide output to a touch user interface display screen or other type of output device.

As mentioned briefly above, the mass storage device 1514 and the RAM 1510 of the computing system 1500 can store software instructions and data, including one or more software applications 1516. The software applications may include a mobile and/or web application to interface with models as described herein, or may include one or more modeling and/or image processing techniques useable to perform the virtual staging techniques as described.

The software instructions include an operating system 1518 suitable for controlling the operation of the computing system 1500. The mass storage device 1514 and/or the RAM 1510 also store software instructions, that when executed by the one or more processors 1502, cause one or more of the systems, devices, or components described herein to provide functionality described herein. For example, the mass storage device 1514 and/or the RAM 1510 can store software instructions that, when executed by the one or more processors 1502, cause the computing system 1500 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures, systems, and methods shown and described above.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A virtual staging platform comprising a computing system including a processor and a memory communicatively connected to the processor and storing instructions which, when executed by the processor, cause the virtual staging platform to perform:

receiving, at the computing system, a plurality of images of a space including at least a first image captured at a first perspective and a second image captured at a second perspective different from the first perspective;

receiving, at the computing system, a room type input and a style theme input, the room type input and style theme input being associated with the plurality of images;

generating, at a transformer model, a three-dimensional reconstruction of the paired images;

providing the room type input, the style theme input, and a selected image from among the first image and the second image to a diffusion model to perform a staging process, the staging process generating a first staged image of the space including a selection and layout of a plurality of virtual furnishing items depicted in the selected image, the plurality of virtual furnishing items generated by the diffusion model in accordance with the selected room type input and style theme input;

generating, based on another image of the first image and the second image, a second staged image of the space using a second diffusion model, the second staged image being a reprojection, within the another image, of the plurality of virtual furnishing items in accordance with the selection and layout; and rendering the first staged image and the second staged image, using a rendering module, to generate higher-resolution representations of at least the virtual furnishing items within the first staged image and the second staged image.

2. The virtual staging platform of claim 1, wherein the instructions further cause the virtual staging platform to perform:

generating a reprojection mask based on the first staged image of the space including the plurality of virtual furnishing items; and wherein generating the second staged image is further based on use of the reprojection mask to indicate the layout of the virtual furnishing items.

3. The virtual staging platform of claim 2, wherein generating the reprojection mask includes generating a reprojection of the plurality of virtual furnishing items from the second perspective and generating the reprojection mask based on the reprojection.

4. The virtual staging platform of claim 1, wherein the staging process generates the first staged image to include a first generated image and a first semantic segmentation map, and wherein the reprojection corresponding to the second staged image includes a second generated image and a second semantic segmentation map.

5. The virtual staging platform of claim 1, wherein the room type input and the style type input are received via at least one of (1) a user interface generated by the virtual staging platform and presentable on a computing device communicatively connected thereto, or (2) a classifier model.

6. The virtual staging platform of claim 1, wherein the instructions further cause the virtual staging platform to perform:

removing one or more preexisting furnishing items from at least one image of the plurality of images.

7. The virtual staging platform of claim 6, wherein removing the one or more preexisting furnishing items includes:

receiving a selection of an area within the at least one image that includes the one or more preexisting furnishing items, the section defining a mask.

8. The virtual staging platform of claim 1, wherein the staging process includes:

preprocessing the selected image to extract geometry and features of the space that is the subject of the selected image;

generating a staged image based on the selected image that includes virtual furnishing items and a layout of virtual furnishing items; and generating a photorealistic rendering of the staged image including the virtual furnishing items.

9. The virtual staging platform of claim 1, wherein the three-dimensional reconstruction includes a first location indicator identifying the first perspective and a second location indicator identifying the second perspective.

10. The virtual staging platform of claim 1, wherein the rendering module imparts at least one of textural effects and lighting effects on at least one of the first image or the second image.

11. The virtual staging platform of claim 10, wherein the rendering module includes an image segmentation module, an object detection module, and one or more diffusion models, wherein the image segmentation module and object detection module determine a layout and structure of the virtual furnishing items, and generate one or more control constraints provided to the one or more diffusion models used to generate the higher-resolution representations.

12. The virtual staging platform of claim 1, wherein the diffusion model is trained on image pairs of empty and staged rooms labeled with a room type and a style theme.

13. The virtual staging platform of claim 1, wherein generating the three-dimensional reconstruction of the paired images includes a regression model generating at least a first three dimensional pointmap associated with the first image and a second three dimensional pointmap associated with the second image, the first three dimensional pointmap and the second three dimensional pointmap being expressed in a common coordinate frame.

14. A method of performing multi-view virtual staging, the method comprising:

receiving, at a computing system, a plurality of images of a space including at least a first image captured at a first perspective and a second image captured at a second perspective different from the first perspective;

receiving, at the computing system, a room type input and a style theme input, the room type input and style theme input being associated with the plurality of images;

generating, at a transformer model, a three-dimensional reconstruction of the paired images;

providing the room type input, the style theme input, and a selected image from among the first image and the second image to a diffusion model to generate a first staged image object of the space including a selection and layout of a plurality of virtual furnishing items depicted in the selected image, the plurality of virtual furnishing items generated by the diffusion model in accordance with the selected room type input and style theme input;

generating, based on another image of the first image and the second image, a second staged image object of the space using a second diffusion model, the second staged image object including a reprojection, within the another image, of the plurality of virtual furnishing items in accordance with the selection and layout; and rendering, at the computing system, the first staged image object and the second staged image object to generate higher-resolution representations of at least the virtual furnishing items within a first staged image and a second staged image.

15. The method of claim 14, wherein:

generating the three-dimensional reconstruction of the paired images includes a regression model generating at least a first three dimensional pointmap associated with the first image and a second three dimensional pointmap associated with the second image, the first three dimensional pointmap and the second three dimensional pointmap being expressed in a common coordinate frame, and rendering the first staged image and the second staged image are both performed using an image segmentation module, an object detection module, and one or more diffusion models, wherein the image segmentation module and object detection module determine a layout and structure of the virtual furnishing items, and generate one or more control constraints provided to the one or more diffusion models used to generate the higher-resolution representations.

16. The method of claim 14, wherein generating the first staged image is performed using a concatenation of the first image and the second image to generate first image objects indicating the plurality of virtual furnishing items, and wherein generating the second staged image is performed at the second diffusion model, and wherein the second diffusion model receives the first staged image objects and the concatenation of the first image and the second image to generate the second staged image objects, wherein the second staged image objects include the second staged image concatenated with the first staged image.

17. A method of performing virtual staging of a living space, the method comprising:

receiving, at a computing system, an image of a space;

receiving, at the computing system, a room type input, and a style theme input;

obtaining a depth map of the image and a color map of the image;

prompting a diffusion model to generate a staged image including a selection and layout of a plurality of virtual furnishing items depicted in the depth map based on the room type input and the style theme input and merging the staged image with the color map to generate an output image, wherein the plurality of virtual furnishing items are depicted by the diffusion model in accordance with the selected room type input and style theme input, and the diffusion model is trained on image pairs of empty and staged rooms labeled with a room type and a style theme; and performing a rendering operation at the computing system to generate a higher-resolution output image, the rendering operation including applying an image segmentation module, an object detection module, and one or more diffusion models, wherein the image segmentation module and object detection module determine a layout and structure of the virtual furnishing items, and generate one or more control constraints provided to the one or more diffusion models used to generate the higher-resolution representations.

18. The method of claim 17, further comprising performing a removal process on an input image to generate the image of the space, the removal process including:

receiving a definition of a mask identifying an area of the input image that includes a depiction of one or more objects to be removed from the input image; and performing a removal process, using a second diffusion model, to generate a removal image with the one or more objects removed relative to the input image, the diffusion model being trained with pairs of images of furnished and empty rooms and including a low-rank adaptation fine-tuning on one or more layers in the diffusion model.

19. The method of claim 18, further comprising:

generating a plurality of removal images; and based, at least in part, on a comparison of image characteristics within the mask and outside of the mask within the input image, selecting one of the plurality of removal images as the image of the space.

20. The method of claim 19, wherein the comparison of image characteristics includes a statistical analysis of surface texture of surfaces depicted within the mask and outside of the mask.

21. The method of claim 18, wherein the diffusion model is trained on image pairs of empty and staged rooms labeled with a room type and a style theme, and the second diffusion model is trained on inverse image pairs.

* * * * *